(12) United States Patent
Schulte et al.

(10) Patent No.: US 7,198,156 B2
(45) Date of Patent: Apr. 3, 2007

(54) DAM BASKET FOR VIBRATORY SEPARATORS

(75) Inventors: David L. Schulte, Willis, TX (US); Charles N. Grichar, Houston, TX (US); Richard J. Koch, Magnolia, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 11/180,037

(22) Filed: Jul. 12, 2005

(65) Prior Publication Data

US 2006/0011520 A1 Jan. 19, 2006

Related U.S. Application Data

(60) Continuation-in-part of application No. 11/071,603, filed on Mar. 3, 2005, and a continuation-in-part of application No. 10/169,484, filed on Sep. 16, 2002, now Pat. No. 6,863,183, which is a division of application No. 09/716,176, filed as application No. PCT/GB01/04667 on Oct. 19, 2001, now Pat. No. 6,371,301.

(51) Int. Cl.
*B07B 1/00* (2006.01)
*B07B 1/28* (2006.01)
*C02F 9/02* (2006.01)

(52) U.S. Cl. .................. 209/309; 209/267; 210/255
(58) Field of Classification Search ............... 209/314, 209/359, 360, 373, 311, 255, 264, 265, 267; 210/255
See application file for complete search history.

(56) References Cited

U.S. PATENT DOCUMENTS

| | | | | |
|---|---|---|---|---|
| 964,897 A | 7/1910 | Bryant | | |
| 1,438,783 A | 12/1922 | Pessell | | 209/397 |
| 1,802,567 A * | 4/1931 | Minich | | 209/420 |
| 1,964,716 A * | 7/1934 | Ater | | 209/437 |
| 2,089,548 A | 8/1937 | Frantz et al. | | |
| 2,277,817 A * | 3/1942 | Counselman | | 209/18 |
| 2,648,441 A | 8/1953 | Soldan | | |
| 2,910,183 A | 10/1959 | Hayes | | 210/315 |

(Continued)

FOREIGN PATENT DOCUMENTS

GB      2085745 A      5/1982

(Continued)

OTHER PUBLICATIONS

Filtration & Separation, The Container Filter, Flo Trend Systems, Inc. 1989.

(Continued)

*Primary Examiner*—Patrick Mackey
*Assistant Examiner*—Mark J. Beauchaine
(74) *Attorney, Agent, or Firm*—Guy McClung

(57) ABSTRACT

A vibratory separator and a screen mounting basket for a vibratory separator for separating components of material introduced into the basket, the vibratory separator including a collection receptacle beneath the basket, at least one screen assembly mounted in the basket, and at least one dam within the basket for intercepting material introduced into the basket, and for forming a relatively deep pool of material over one or more of the screen assemblies.

22 Claims, 12 Drawing Sheets

U.S. PATENT DOCUMENTS

| | | | |
|---|---|---|---|
| 3,747,770 A | 7/1973 | Zantix | 210/402 |
| 3,815,473 A | 6/1974 | Jones, Jr. | 91/248 |
| 3,929,642 A | 12/1975 | Ennis et al. | 210/113 |
| 3,970,549 A | 7/1976 | Ennis et al. | 209/341 |
| 4,033,865 A | 7/1977 | Derrick, Jr. | 209/275 |
| 4,064,051 A | 12/1977 | Wehner | 210/389 |
| 4,065,382 A | 12/1977 | Derrick, Jr. | 209/313 |
| 4,085,776 A | 4/1978 | Derrick, Jr. | 137/561 A |
| 4,446,022 A | 5/1984 | Harry | 210/388 |
| 4,495,065 A * | 1/1985 | DeReamer et al. | 209/243 |
| 4,526,121 A | 7/1985 | Shudo et al. | 114/73 |
| 4,575,421 A | 3/1986 | Derrick et al. | 209/397 |
| 4,613,432 A | 9/1986 | Racine et al. | 209/254 |
| 4,634,535 A | 1/1987 | Lott | 210/780 |
| 4,762,610 A | 8/1988 | Freissle | 209/397 |
| 4,819,809 A | 4/1989 | Derrick | 209/275 |
| 4,840,728 A | 6/1989 | Connolly et al. | 209/405 |
| 4,857,176 A | 8/1989 | Derrick et al. | 209/392 |
| 4,882,054 A | 11/1989 | Derrick et al. | 210/389 |
| 5,045,184 A | 9/1991 | Arkles | 209/405 |
| 5,160,034 A * | 11/1992 | Potter | 209/38 |
| 5,211,291 A | 5/1993 | Kelley et al. | 209/680 |
| 5,221,008 A | 6/1993 | Derrick, Jr. et al. | 209/269 |
| 5,248,043 A | 9/1993 | Dorn | 209/399 |
| 5,330,057 A | 7/1994 | Schiller et al. | 209/392 |
| 5,332,101 A | 7/1994 | Bakula | 209/493 |
| 5,417,793 A | 5/1995 | Bakula | 156/308.2 |
| 5,417,858 A | 5/1995 | Derrick et al. | 210/388 |
| 5,417,859 A | 5/1995 | Bakula | 210/388 |
| 5,494,173 A | 2/1996 | Deister et al. | 209/326 |
| 5,614,094 A | 3/1997 | Deister et al. | 210/388 |
| 5,636,749 A | 6/1997 | Wojciechowski | 209/403 |
| 5,641,070 A | 6/1997 | Seyffert | 209/314 |
| 5,690,826 A | 11/1997 | Cravello | 210/384 |
| 5,720,881 A | 2/1998 | Derrick et al. | 210/308 |
| 5,783,077 A | 7/1998 | Bakula | 210/388 |
| 5,811,003 A | 9/1998 | Young et al. | 210/388 |
| 5,868,929 A | 2/1999 | Derrick et al. | 210/388 |
| 5,876,552 A | 3/1999 | Bakula | 156/308.2 |
| 5,921,399 A | 7/1999 | Bakula et al. | 209/272 |
| 5,944,993 A | 8/1999 | Derrick et al. | 210/388 |
| 5,958,236 A | 9/1999 | Bakula | 210/388 |
| 6,000,556 A | 12/1999 | Bakula | 210/388 |
| 6,004,461 A | 12/1999 | Harris | 210/241 |
| 6,053,332 A | 4/2000 | Bakula | 210/388 |
| 6,059,119 A | 5/2000 | Davis | 209/233 |
| 6,079,568 A * | 6/2000 | Loshe | 209/311 |
| 6,161,700 A | 12/2000 | Bakula | 209/401 |
| 6,220,448 B1 | 4/2001 | Bakula et al. | 209/392 |
| 6,241,098 B1 | 6/2001 | Schulte et al. | 209/401 |
| 2002/0175111 A1 | 11/2002 | Crabbe et al. | 209/269 |

FOREIGN PATENT DOCUMENTS

| | | |
|---|---|---|
| GB | 2144679 A | 3/1985 |
| SU | 1488026 | 11/1987 |
| WO | WO 02/078866 A1 | 10/2002 |

OTHER PUBLICATIONS

"The Derrick LP Sandwich Shaker," Derrick Equipment Co., 1981.
"The Future of Fine Screening," Derrick Equipment Co., 1993.
"Derrick Pyramid Screens," Derrick Corp., 1994.
"Derrick Pyramid Screens," Derrick Equipment Co., 1993.
"Layered Shale Shaker Screens Improve Mud Solids Control," Casle et al, World Oil, 1978.
Principles of High Speed Screening and Screen Machine Design, Derrick Mfg. Corp., 1981.

* cited by examiner

- Mud feed
- Mud box (Back tank, Possum belly)
- C
- Screening surface (Deck)
- Coarse solids discharge
- Bed
- Vibration isolation members (Shock mounts)
- Basket
- Liquid and fine solids Flow

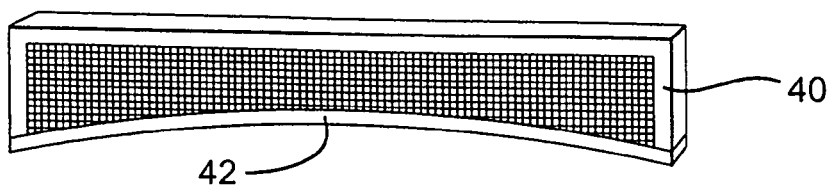
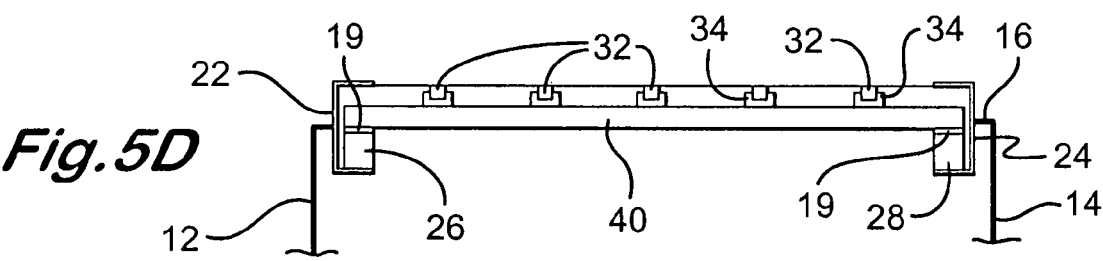
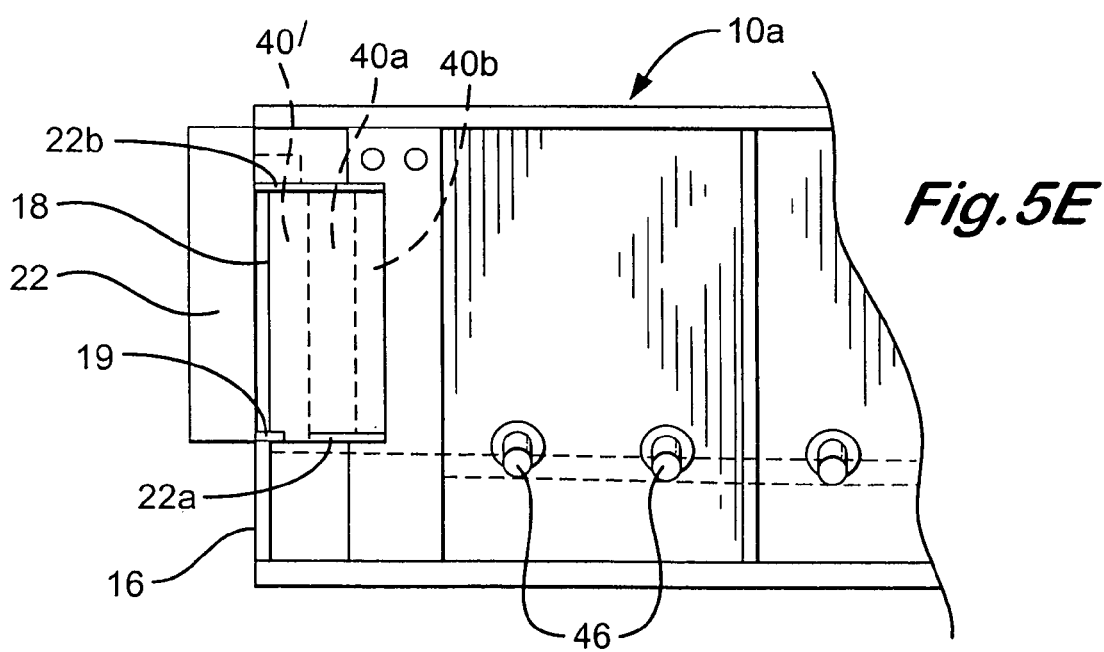

Fig. 9B   Fig. 9C

Fig. 12
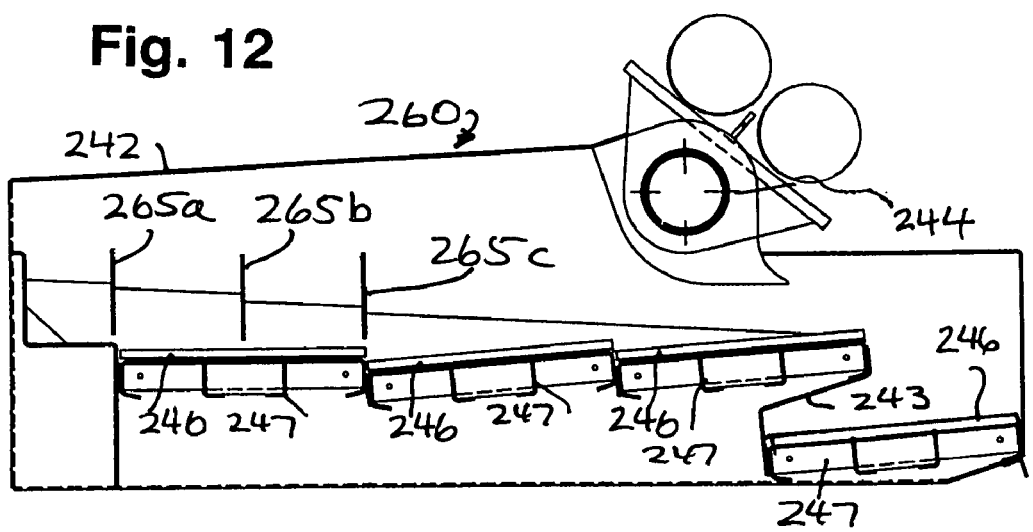
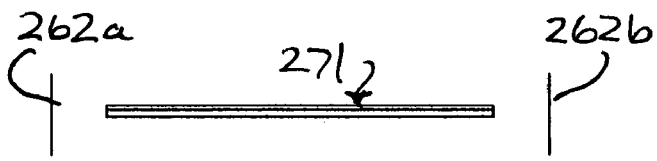
Fig. 13A
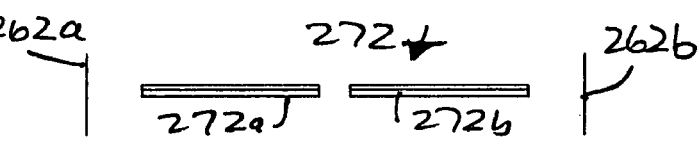
Fig. 13B
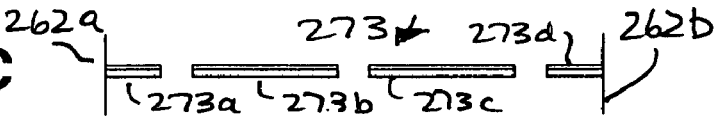
Fig. 13C
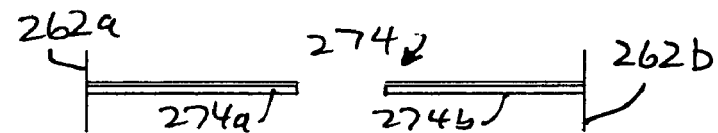
Fig. 13D
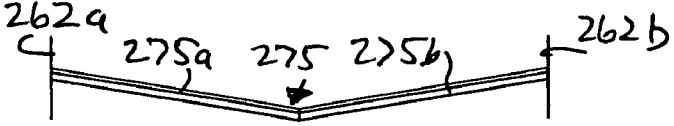
Fig. 13E
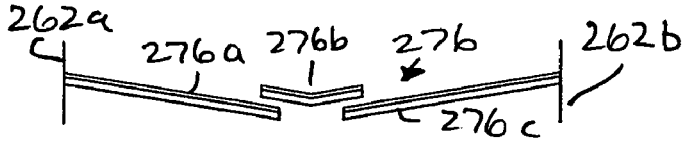
Fig. 13F
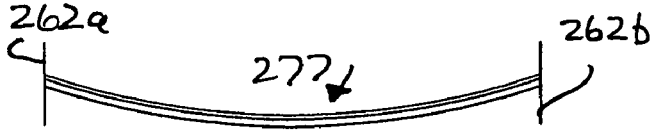
Fig. 13G

DAM BASKET FOR VIBRATORY SEPARATORS

RELATED APPLICATIONS

This is a continuation-in-part of U.S. Ser. No. 11/071,603 filed Mar. 3, 2005 and is a continuation-in-part of U.S. Ser. No. 10/169,484 filed Sep. 16, 2002 (issued as U.S. Pat. No. 6,863,183 on Mar. 8, 2005) which is a division of U.S. application Ser. No. 09/716,176 filed Nov. 17, 2000 (issued as U.S. Pat. No. 6,371,301 B1 on Apr. 16, 2002); and this application claims priority from PCT Application No. PCT/GB01/04667, Int'l Publication No. WO 02/40186 A1, filed Oct. 19, 2001—all of which are incorporated fully herein for all purposes and from all of which the present invention claims priority under the Patent Laws.

BACKGROUND OF THE INVENTION

1. Field of the Invention

The present invention is directed to vibratory separators, screen-supporting baskets for them, and, in certain particular embodiments, to shale shakers for treating drilling fluid, screen-supporting baskets for them, screens for such separators and shakers and methods of using such screens, shakers, baskets, and separators.

2. Description of Related Art

Vibratory separators are used in a wide variety of industries to separate materials such as liquids from solids or solids from solids. Typically such separators have a basket mounted in or over a receiving receptacle and vibrating apparatus for vibrating the basket. One or more screens is mounted in the basket. Material to be treated is introduced to the screen(s). Separated material (e.g. liquid and/or smaller solids) flows through the screen(s) into the lower receptacle and separated larger solids (with or without liquid) move down and off the screen(s).

The need for solids control in drilling fluid or "mud" used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drillbit. The mud picks up cuttings (rock) and other solids from the well and carries them upwardly away from the bit and out of the well in a space between the well walls and the drill string. At the top of the well, the solids-laden mud is discharged over a shale shaker, a device which typically has one or a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

Typically, the screens used with shale shakers are emplaced in a generally horizontal fashion on a generally horizontal bed or support within a basket in the shaker. The screens themselves may be flat or nearly flat (i.e. substantially two-dimensional); or, due to corrugated, depressed, or raised surfaces, are three-dimensional. The shaker imparts a rapidly reciprocating motion to the screen. Material from which particles are to be separated is poured onto a back end of the vibrating screen. The material generally flows toward the front end of the screen. Large particles are unable to move through the screen, remain on top of the screen, and move toward the front of the screen where they are collected. The smaller particles and fluid flow through the screen and collect in a bed, receptacle, or pan beneath the screen.

Referring now to FIG. 1, a prior art shale shaker 1 has a screen 2 (with screen or screening cloth or mesh as desired) mounted on vibratable screen mounting apparatus or "basket" 3. The screen 2 may be any known screen or screens. The basket 3 is mounted on springs 4 (only two shown; two as shown are on the opposite side) which are supported from a frame 6. The basket 3 is vibrated by a motor 5 and interconnected vibrating apparatus 8 which is mounted on the basket 3 for vibrating the basket and the screens. Elevator apparatus 7 provides for raising and lowering of the basket end. Typically the basket will be in a "climb the hill" position (see FIG. 4) so that a pool 9 of liquid is maintained at one end within the basket.

FIG. 2 discloses one example of a typical prior art shaker system (e.g. as shown in U.S. Pat. No. 5,190,645). The system A has a shale shaker K having a screen or screens S. The screen(s) S are mounted in a typical shaker basket B and one or more vibrators V (any known suitable shaker vibrator) vibrate the basket B and hence the screen(s) S. The other components of the system A are as described in U.S. Pat. No. 5,190,645 incorporated fully herein for all purposes.

FIG. 3 shows schematically a prior art system C with a Mud Box (Back tank, Possum Belly) to distribute the flow to a screening surface. The screens are mounted in a Deck (Basket) which is vibrated to assist the throughput of mud and movement of separated solids. The deck rests on Vibration Isolation Members, such as helical springs or rubber mounts. The vibration isolation members rest on the support member, which is also used to divert flow as desired, and is called a Bed. There are many deck, basket configurations used depending on the design criteria. The deck, basket, may be flat, horizontal, or mounted at a slope.

On sloped deck units (e.g. cascade or parallel flow), the screens may be continuous with one screen covering the entire deck length, or have a divided deck which has more than one screen used to cover the screening surface, or with individual screens mounted at different slopes. On multiple deck units, more than one screen layer may be employed. In a two or three deck unit, the mud passes through one screen before flowing through the second.

The motion of the shaker controls the efficiency of separation, rate of travel of cuttings on the screen, solids separation capacity and fluid capacity. The shape and axial direction of the vibration motion along the deck is controlled by the position of the vibrator relative to the deck and the direction of rotation of the vibrator.

Shale shakers have capacity limits. Exceeding a capacity limit means excessive mud will be discharged over the ends along with the solids. Capacity limits are typically defined for non-blinded screens. Capacity limits of a shale shaker include:

1. The solids capacity limit is the maximum amount of solids that a device will remove; and
2. The liquid limit—the maximum GPM capacity for various drilling muds.

The solids capacity limit is encountered when drilling soft, gummy formations. Usually the liquid limit controls the minimum size screen that can be used for a given circulation rate. The thicker the mud, the lower the GPM capacity. Open area of the screens and usable area of the screening deck influence this limit. The solids capacity and/or liquid capacity varies with different shaker designs. In practice, the smallest screen size that can be employed without flooding a unit is used.

There is a need for an efficient vibratory separator system which is efficient and cost-effective with increased efficiency, and screen throughput.

SUMMARY OF THE PRESENT INVENTION

The present invention discloses, in at least some aspects, a vibratory separator or shale shaker with a screen mounting basket having a one or more dams across the basket, the dam(s) made of solid material, or of perforated and/or foraminous and/or screening material, or made with a perforated portion and, in one aspect, with a space between a lower part of the dam(s) and the upper part of the basket floor so that some material flows under the dam(s).

The present invention discloses, in at least some aspects, a screen mounting basket for a vibratory separator or shale shaker for separating components of material introduced into the basket (e.g. drilling cuttings material), the vibratory separator including a collection receptacle beneath the basket, the basket including two opposed spaced-apart side walls having first ends and second ends, the first ends spaced-apart by spaced-apart end walls connected to each of the side walls; a basket bottom between the two spaced-apart side walls; at least one vertical dam and/or at least one screen assembly positioned vertically in the basket for intercepting material introduced into the basket and for screening said material; and the at least one screen assembly extending from one side wall of the basket to the other. The present invention discloses, in at least certain aspects, a screen-supporting basket for a shale shaker or other vibratory separator that includes two side walls spaced-apart and interconnected by an end wall at a first end. A second end has bracing, bars, or beams spacing-apart the side walls, the bracing etc. positioned so that an end of a screen is above it. One or more screens (any known in the art) for treating fluid introduced at the shaker's first end are mounted in the basket in any way known in the art. The basket is mounted over a receptacle for receiving fluid and/or solids flowing through the screen(s).

The end wall at the first end of the basket has an opening therethrough. An upright end screen is emplaced over or in this opening so that liquid and/or solids in the material introduced into the basket may flow through this screen and into the receptacle below the basket. Such an end screen according to the present invention can be provided for any known basket when an end opening according to the present invention is provided in the basket's end wall. Such an end opening may be any desired size or shape and can extend for only a portion or over substantially all of the end wall.

In one aspect the screen is releasably held in place over the end-wall opening by sliding it down into channel members on either side of the openings and blocking or wedging it in place. Any suitable seal or gasket or sealing material may be used on the screen, on the channels and opening edge, or on both to sealingly position the screen over the opening. Any other suitable method or structure may be used to releasably position and hold the end screen over the end opening, including, but not limited to, channels alone, nuts and bolts, clamps, glue or other adhesive, releasably cooperating fastener material such as VELCRO™ material, or screws. Any known inflatable structure or bladder, or releasable tensioning bolts may be used to hold a screen in place. Alternatively the screen can be welded, soldered, or brazed at the openings edges. The end screen may be a single integral screen or multiple adjacent end-to-end screens may be used at the basket end. Also, multiple adjacent vertical screens may be used positioned so that fluid from within the basket flows through all of them. Such vertically "stacked" screens may all be mounted within the basket; outside the basket; or one or more of them may be mounted within the basket and one or more of them mounted outside the basket—with appropriate mounting members, gaskets, seals, seal members, and/or bolts and nuts so that fluid flows through the screens and then exits from an outermost screen.

In one aspect the end screen has a plate, mounting structure, or frame and with a lower part that is perforated or has holes or openings so that fluid flowing onto it flows through this part of the frame and out and down into the collection receptacle beneath the basket.

A shaker, in one embodiment according to the present invention, e.g. with basic components as the shaker in FIG. 1, is, according to the present invention, provided with any basket and/or dam or dams as described herein according to the present invention.

In other aspects one or both sides of a basket as described above according to the present invention also has one or more side screens through which fluid and/or solids from the material introduced into the basket can flow out and down into the collection below the basket. Optionally, there is no end screen as described above and only screen(s) on one or both side walls. Such side wall screens may be any as described above mounted in any way as described above for end screens.

In one basket according to the present invention a plurality of openings are provided on the side walls and end walls of the basket and, as desired, a screen may be used over any, some, or all the openings. For an opening not covered by a screen, a blocking plate or member is releasably and sealingly installed over the opening(s) to close off the opening to flow. According to the present invention one or more such screens may be installed within the basket on its interior over the opening or on the basket's exterior surface over the opening. Alternatively, with appropriate holding devices, a screen according to the present invention may be sized to fit sealingly within an opening. Any known flat, substantially flat, two-dimensional or three-dimensional screen or screen assembly, appropriately sized and configured, may be used according to the present invention to close off one or more end and/or side basket openings.

A basket as described above according to the present invention provides more screening area to treat material and separate its components than a conventional basket with the same footprint. By thus increasing the available screening area, the load on the horizontal screen(s) is reduced; their efficiency, and productivity are increased; and total throughput for the basket is increased. Shaker or screen capacity is typically determined by the position of a "fluid-end point". The fluid end-point is the point where the fluid pool stops on the screen surface near the shaker's discharge end. As the fluid-end point moves closer to the discharge end, discharged solids can become too wet, risking whole mud losses over the screen. A typical rule of thumb for optimum shaker capacity specifies covering 66% or less of the shaker's screen surface. The integration of vertical screens into a shaker basket according to the present invention shortens the length of the fluid pool, effectively increasing shaker capacity.

Solid loading has as great an effect on shaker capacity as liquid volume. As solids take up screen area, liquid throughput is impeded due to the moving solids bed on the screen surface. The effect of heavy solids loading on screening capacity is exponential. Heavy solids loading creates a condition for fluid to ride on top of the moving solids bed, and creates conditions susceptible to whole mud losses. One solution to this problem has been to use coarser screens to prevent whole mud losses. This solution solves the immediate concern for the loss of whole mud, but may be at the expense of poor solids control.

The motion of the basket conveys solids away from the vertical screen(s) at the rear and/or sides of the shaker basket. Thus some portion of the fluid in the pool that exits through end and/or side basket screen(s) according to the present invention bypasses the traditional routing of prior art baskets, thereby enhancing shaker capacity.

Baskets according to the present invention with one or more screens according to the present invention enhance capacity, especially if there is enough flow to generate a pool on the screen surface. This is particularly true during heavy solids loading due to high penetration rates and large diameter hole conditions, or both.

In certain aspects, the end screen in a basket according to the present invention is at such an angle to the direction of the force of strokes of the vibrating apparatus that separation is enhanced as compared to the angle of these strokes with respect to the horizontal screen(s).

When a basket (which may be any basket disclosed herein and may be any basket disclosed herein with at least one dam as disclosed herein) in a shaker has one elevated end (as shown in FIG. 4) so that the separated solids run "uphill", liquid is prevented from running off the screen's exit end; and a pool of liquid is formed at the basket's opposite end—by using an end wall opening(s) and screen(s) and/or appropriately located side wall opening(s) and screen(s) a portion of this liquid (and perhaps some small separated solids) flows out from the basket through the end screen(s) and/or side screen(s) and the horizontal screen(s) in the basket beyond the pool are not impacted by and do not have to process this portion of the liquid that flows out through the end screen (s) and/or side screen(s). Optionally, part or all of a basket's floor may be closed off to flow rather than completely or substantially completely covered with screen(s). In one aspect part of all of the area beneath a pool formed in a basket is closed off to flow and side and/or end screens treat the pool material.

The present invention, in one embodiment includes a shale shaker with a frame; a "basket" or screen mounting apparatus in the frame; one or more screens positioned in a flat position in the basket; basket vibrating apparatus; one or more end basket screens and/or one or more side basket screens; and a collection tank or receptacle below the basket. In one particular aspect shale shakers according to the present invention treat drilling fluid with solids therein.

In certain embodiments the present invention discloses a screen mounting basket for a vibratory separator for separating components of material introduced into the basket, the vibratory separator including a collection receptacle beneath the basket, the basket with two opposed spaced-apart side walls having first ends and second ends, the first ends spaced-apart by an end wall connected to each of the side walls, a basket bottom opening between the two spaced-apart side walls, basket bottom screening apparatus at the basket bottom opening, at least one basket aperture not through the basket bottom, at least one aperture screen over the at least one basket aperture, and the at least one aperture screen and the bottom screening apparatus for separating a component material from the material introduced into the basket, material flowing through the at least one aperture screen not flowing through the bottom screening apparatus, the separated component material flowing into the collection receptacle.

The present invention discloses, in certain aspects a screen apparatus for a vibratory separator, the vibratory separator having a basket, the vibratory separator for separating components of material introduced into the basket, the vibratory separator including a collection receptacle beneath the basket, the screen apparatus including screening material, a support, the screening material on the support, the support having a plurality of openings therethrough suitable for the flow of fluid therethrough, the fluid from the material introduced into the basket, the support having a plurality of fluid conducting channels therein at an angle to the plurality of openings so that fluid flowing into one of the plurality of openings may then flow into one of the plurality of fluid conducting channels and out from the support into the receptacle. In one aspect a screen assembly with such a support (e.g. a frame or a plate) is stood on end at an end or side basket opening.

The present invention discloses, in certain aspects, a vibratory separator system for separating components from a liquid-solid mixture fed to the vibratory separator system, the vibratory separator system with a frame, a screen mounting basket on the frame, vibrating apparatus connected to the screen mounting basket for vibrating the screen mounting basket, the screen mounting basket like any described herein according to the present invention.

The present invention discloses, in certain aspects, a method for reducing the weight of material on the bottom screening apparatus of a vibratory separator, the vibratory separator having a screen mounting basket into which the material is introduced, the vibratory separator including a collection receptacle beneath the basket, the basket with a plurality of interconnected walls, a basket bottom opening between the walls, basket bottom screening apparatus at the basket bottom opening, at least one basket aperture through one of the walls and not through the basket bottom, at least one aperture screen over the at least one basket aperture, and the at least one aperture screen and the bottom screening apparatus for separating a component material from the material introduced into the basket, the separated component material flowing into the collection receptacle, the method including introducing the material into the basket, flowing part of the material through the at least one aperture screen, said part flowing into the receptacle without passing through the bottom screening apparatus.

It is, therefore, an object of at least certain preferred embodiments of the present invention to provide:

New, useful, unique, efficient, non-obvious baskets for vibratory separators and shale shakers and methods for using them to separate components of material to be treated thereby.

Such items with baskets with at least one dam across the basket;

Such items with baskets with one or more end wall openings with one or more end wall screens for treating material; and/or with one or more side wall openings with one or more side wall screens for treating material;

Such a basket which provides for a pool on top of a topmost screening layer that has a pool end boundary that is relatively further away from a discharge end of a shaker as compared to such pools in prior art shakers or vibratory separators;

Such a shaker with any such basket; and

A system with any such basket that has relatively increased throughput and which increases screen life.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

U.S. application Ser. No. 09/716,176 filed Nov. 17, 2000 is incorporated herein fully for all purposes.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 5B is a perspective view of a screen for the basket of FIG. 5A. FIG. 5C is an end view and FIG. 5D is a partial top view of the basket of FIG. 5A. FIG. 5E is a side view of a basket according to the present invention.

FIG. 9B is a top view of a dam of the shake shaker of FIG. 9A. FIG. 9C is a front view of the dam of FIG. 9B.

FIG. 12 is a side section view of a shale shaker according to the present invention.

FIG. 13A is a top view of a dam according to the present invention. FIG. 13B is a top view of a dam according to the present invention. FIG. 13C is a top view of a dam according to the present invention. FIG. 13D is a top view of a dam according to the present invention. FIG. 13E is a top view of a dam according to the present invention. FIG. 13F is a top view of a dam according to the present invention. FIG. 13G is a top view of a dam according to the present invention.

DESCRIPTION OF EMBODIMENTS PREFERRED AT THE TIME OF FILING FOR THIS PATENT

Figure 1:
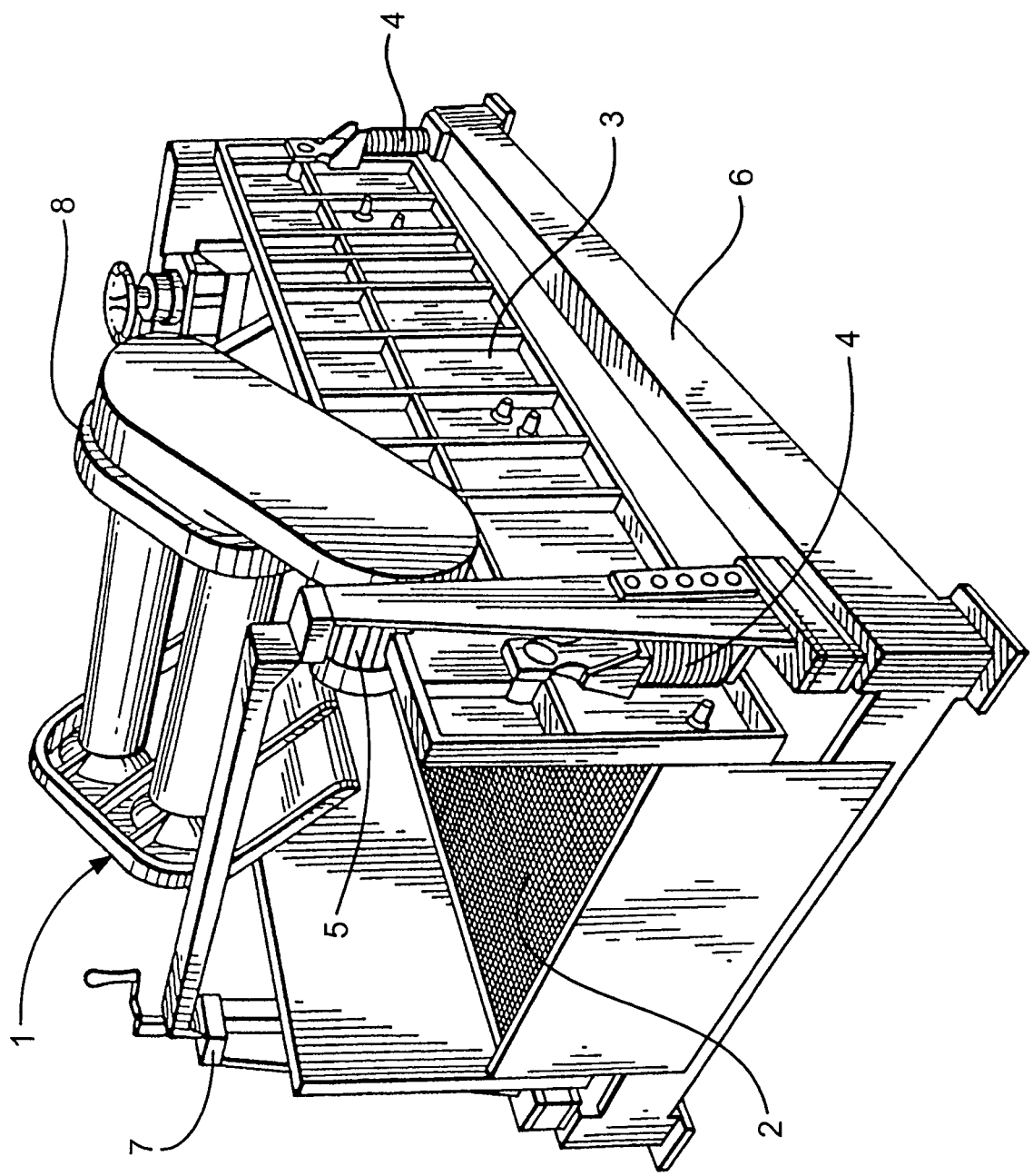
FIG. 1 is a perspective view of a prior art shale shaker.
Figure 2:
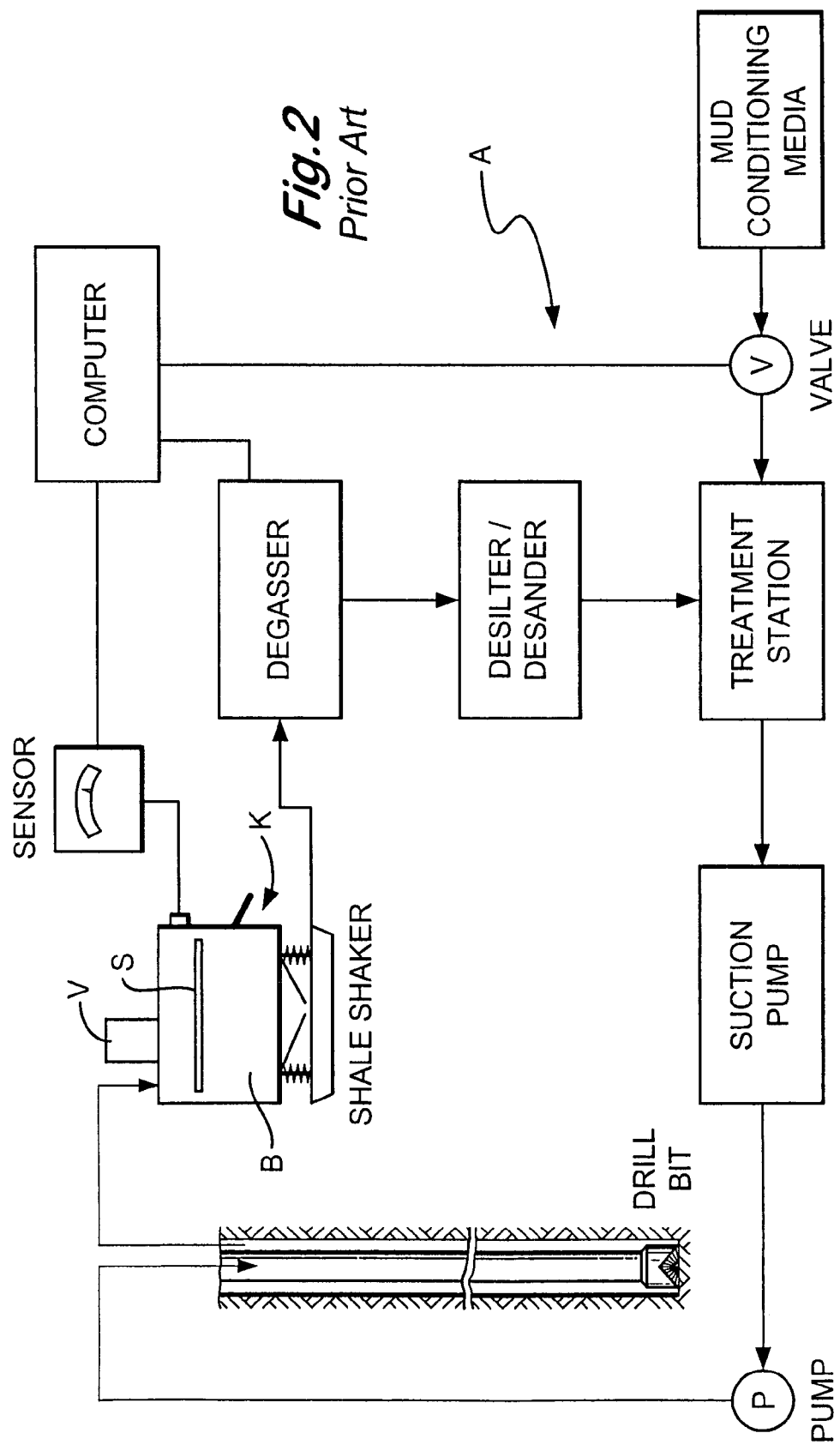
FIG. 2 is a schematic view of a prior art shaker system.
Figure 3:
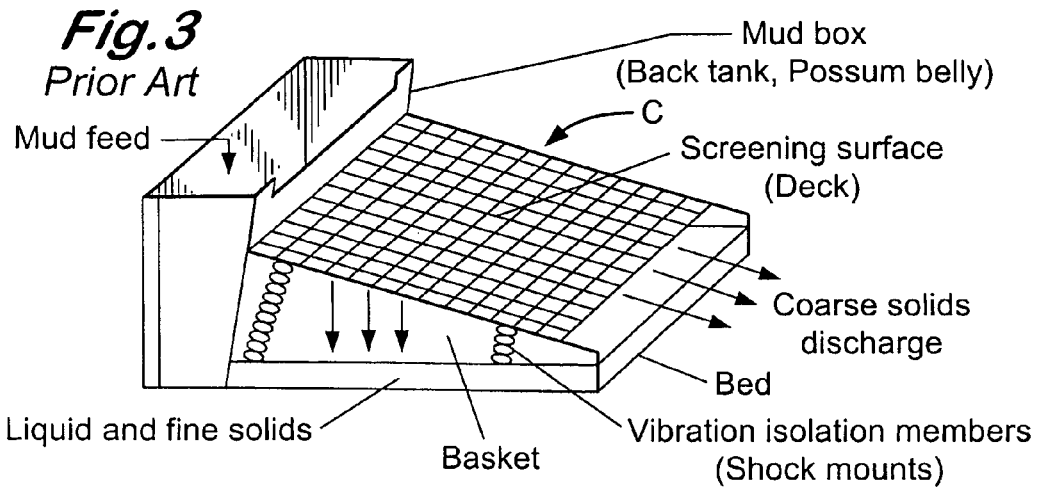
FIG. 3 is a schematic view of a prior art shaker.

Referring now to FIGS. 5A–5D, a screen-supporting basket 10 for a vibratory separator or shale shaker has two spaced-apart side walls 12, 14 and an end wall 16 between them. Typical vibrator apparatus 20 is connectible to the basket 10. An end screen 40 is mounted in channels 22, 24 on opposite sides of the end wall 16. Screen mounting apparatus 46 may be any such known apparatus.

In one aspect the channels 22, 24 are open at the top so the screen 40 can be introduced into the space between the channels 22, 24. Optional removable blocks 26, 28 on the interior of the basket hold the screen 40 in place in the channels; and optional crown bars 32 on the screen 40's exterior provide support for the screen 40. In one aspect each crown bar 32 has a rubber part 34 that contacts the screen 40. Screening material on the screen 40 (as on any screen according to the present invention) may be any suitable known screening material, including, but not limited to one, two, three or more layers of known screening material and/or mesh, two-dimensional or three-dimensional, bonded, glued, connected or unconnected.

The screen 40 may, optionally, have a curved lower portion 42 that corresponds to a curved-shape assumed by screens (not shown) mounted in the basket 10.

The screen 40 is emplaced over an opening 18 in the end wall 16. Optionally a sealing gasket 19 or other seal material or seal member is used around the opening 18.

A basket 10 (and any basket according to the present invention) may be used with any suitable known shaker or separator.

Figure 5A:
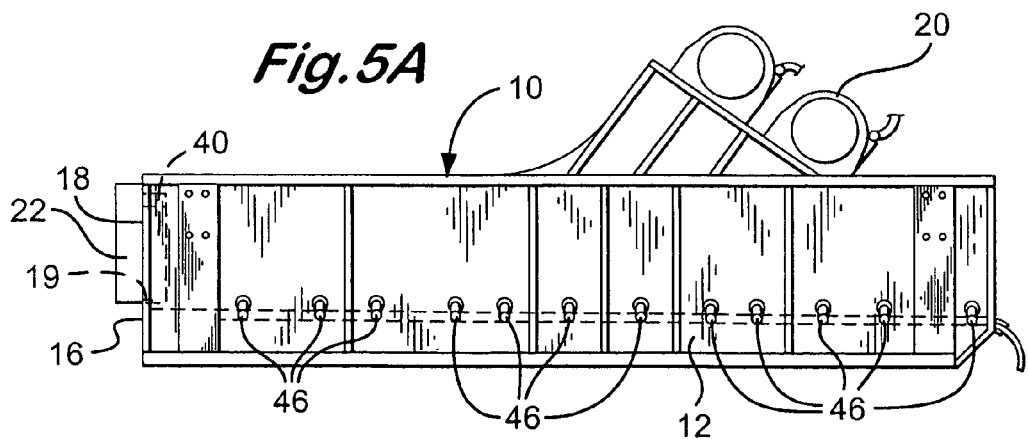
FIG. 5A is a side view of a basket according to the present invention.

FIG. 5E shows another embodiment 10a of a basket 10 with multiple vertical end screens 40 (as above), 40a, and 40b supported on lower part 22a of the channel 22 and positioned beneath upper part 22b of the channel 22. Alternatively, the screens may have appropriate frames or other mounting members and/or structure so that they can be bolted in place. The screens 40a and 40b may be like the screen 40 with the screening material described for the screen 40 (and like numerals in FIGS. 5A and 5E are for like items). Each screen may have similar or different screening material. Two, three, four or more such screens may be used at a basket end and/or side(s) with screens positioned within or outside the basket.

Figure 5F:
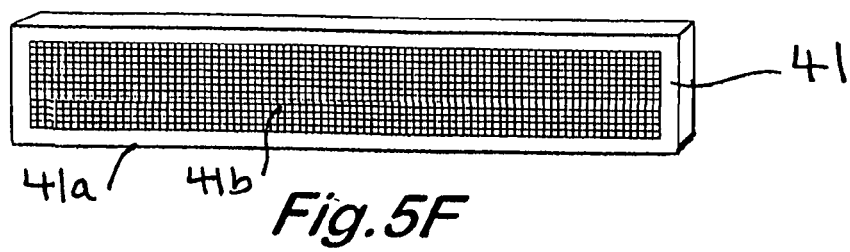
FIG. 5F is a perspective view of a screen assembly according to the present invention.

FIG. 5F shows a screen assembly 41 according to the present invention which has a frame 41a and screening material 41b (which may be any screening material layer or layers referred to herein). In one aspect the screen assembly 41 has a frame 41a like the frame of the frame in FIG. 6A with one, two, three, four, five or more holes (like the holes 64). Alternatively, there are no holes like the holes 64 in the frame 41a (as there are in the frame in FIG. 6A) and material flows from one side of the frame 41a to the other through the screening material 41b. With one or more holes (like the holes 64) present in the frame 41a some of the material to be treated flows through screening material into the hole(s) and some of the material to be treated (e.g., but not limited to, drilling cuttings material) flows from one side of the frame to the other through the screening material 41b. In one aspect the screen 40, FIG. 5B, optionally, has hole(s) like the holes 64, FIG. 6A. Any screen assembly 40 or 41 may have a plate as in FIGS. 6B–6D and/or as in FIG. 8.

Figure 5G:
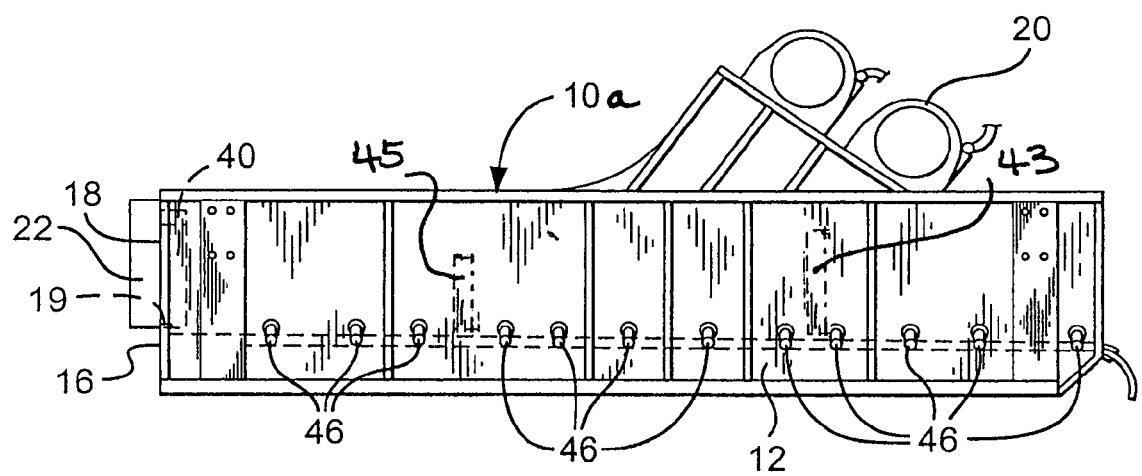
FIG. 5G is a side view of a basket according to the present invention.

FIG. 5G illustrates a basket 10a according to the present invention, like the basket 10, FIG. 5A, and like numerals indicate like parts. The basket 10a includes a screen assembly 43 and a screen assembly 45 mounted therein. It is within the scope of the present invention to delete one or two of the screen assemblies 40, 43, 45 and/or to have one or two additional screen assemblies 40, 43 and/or 45 spaced apart in the basket 10a. The screen assemblies 43, 45, or either of them, may be like the screen assembly 40, the screen assembly 41 or any screen assembly according to the present invention.

As shown the screen assembly 43 is taller than the screen assembly 45. According to the present invention, this may be reversed with the screen assembly 43 in the position of the screen assembly 45 or both screen assemblies may be the same height. In certain aspects the screen assemblies are sufficiently high that little or no material to be treated flows over the top of a screen assembly. In other aspects according to the present invention the screen assemblies or one of them are of such a height that a portion (e.g., but not limited to, one fourth, one half, or three-fourths) of the material first encountering a screen assembly flows over the top thereof.

Figure 5H:
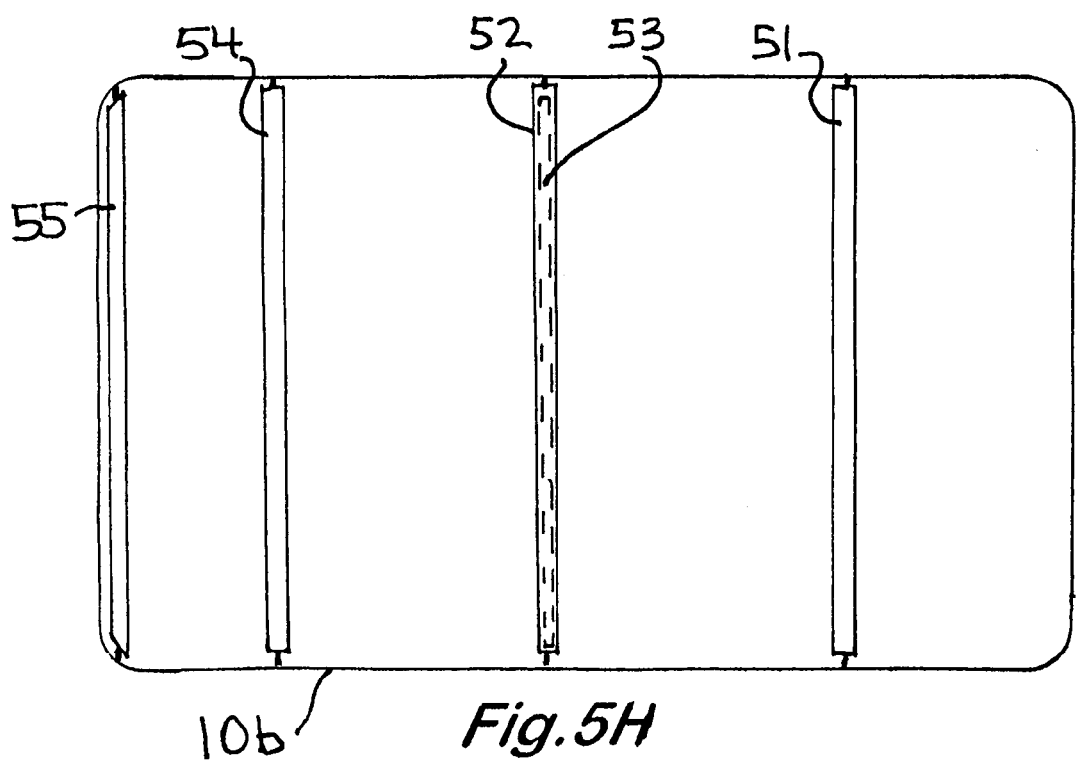
FIG. 5H is a top schematic view of a basket according to the present invention with screens according to the present invention.

FIG. 5H shows a basket 10b according to the present invention with four screen assemblies 51, 52, 54, 55 mounted therein (e.g. like the screen assemblies 40, 43, and/or 45). The screen assemblies 51, 52, 54, 55 or any of them may be as any screen assembly according to the present invention, including, but not limited to, the screen assemblies 40, 41, 43, and/or 45 in any of their embodiments described above. In one particular aspect, the screen assembly 52 (and also the screen assemblies 51, 54, and 55) have a hole or holes like the holes 64, FIG. 6A and material flowing to and through the hole(s) flows into an opening 53 in the bottom of the basket 10b and then into a lower receptacle beneath the basket (and any of the other screen assemblies may be so mounted above an opening like the opening 53).

Any one, two, or three of the screen assemblies in FIG. 5H may be deleted.

Also, one or some of the screen assemblies may be mounted above an opening like the opening 53 while the remaining screen(s) are not mounted above such an opening.

Any of the screen assemblies in FIGS. 5A–5H may be used with any known basket or with any basket according to the present invention (providing, with respect to known baskets openings, as desired, are provided according to the present invention through the screen((s)) in the bottom of the basket).

Figure 6A:
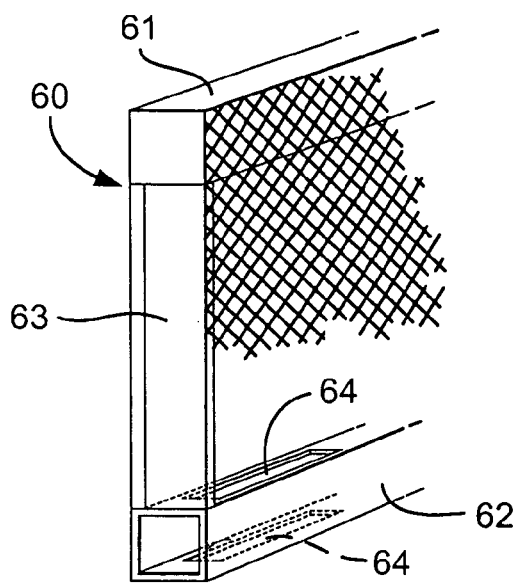
FIG. 6A is a perspective view of a plate according to the present invention for a screen according to the present invention.

FIG. 6A shows part of a tubular frame 60 used as a screen support for screening material for a screen assembly according to the present invention for use in a vibratory separator or shale shaker.

The frame 60 has a top member 61 and a bottom member 62.

A plurality of cross members 63 (one shown) interconnect the top and bottom members.

One, two, three, four, or more holes 64 (or a series of perforations through the bottom member 62) provide for fluid flow through the bottom member 62 (shown as hollow; solid bottom members with one or more holes or perforations may be used). In one aspect the top member also has such a hole or holes 64.

Figure 6B:
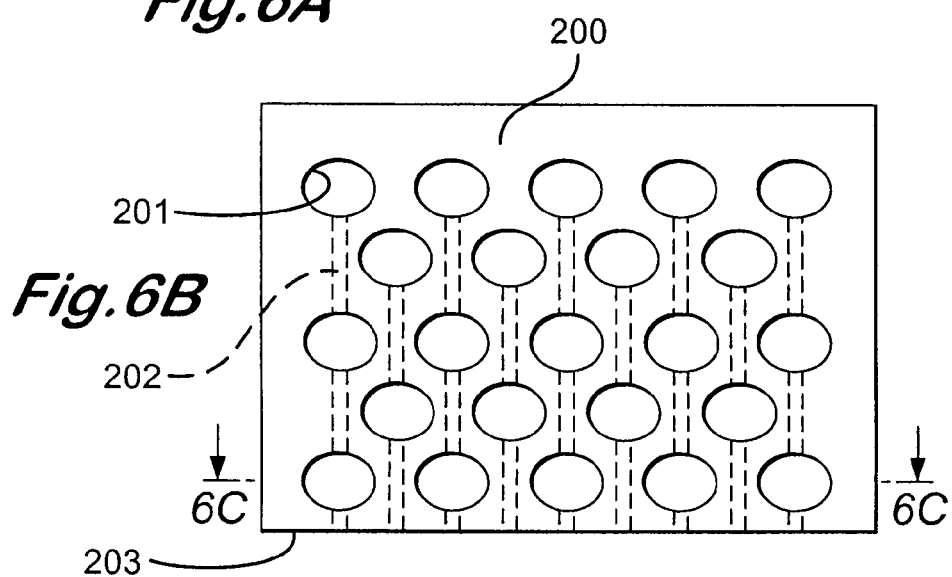
FIG. 6B is a top view of a perforated plate according to the present invention.
Figure 6C:
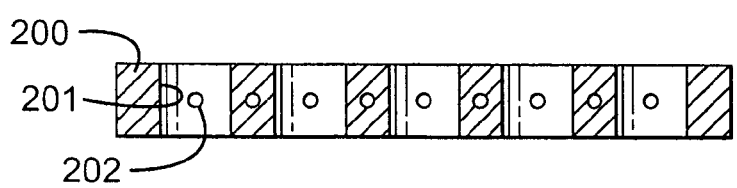
FIG. 6C is a cross-section view along line 6C—6C of FIG. 6B.

FIGS. 6B and 6C show a perforated plate 200 for supporting screening material (not shown) for a screen assembly for a vibratory separator, particularly for an end screen or side basket screen according to the present invention as described herein. The perforated plate 200 has a plurality of spaced-apart openings 201 or holes extending through the plate from one surface to the other. A second series of spaced-apart openings 202 or holes extend from the topmost row of openings 201 (as viewed in FIG. 6B) to a bottom side 203 of the plate 200. Openings 202 intersect openings 201 so that fluid flowing into an opening 201 can flow down (as viewed in FIG. 6B) and out from the plate 200, e.g. into a receptacle of a vibratory separator or shale shaker beneath a basket in which is mounted a screen assembly with such a plate.

It is within the scope of this invention for any known perforated plate or perforated member used as a support for a screen assembly which has a known series of spaced-apart perforations, holes, openings, etc. to have a second series of perforations, openings or holes (e.g. but not limited to like the holes 202) at any desired angle to the perforations, holes or openings, etc. through the plate (including, but not limited to at a right angle as shown in FIG. 6B) to conduct fluid through the plate as is done by the plate 200.

Figure 6D:
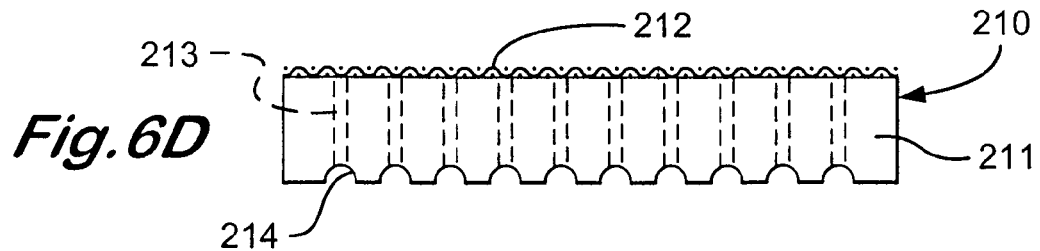
FIG. 6D is a top view of a screen assembly according to the present invention.

FIG. 6D shows a screen assembly 210 for a vibratory separator, according to the present invention, with a perforated plate 211 for supporting screening material 212 on the plate 211, particularly for an end screen or side basket screen according to the present invention as described herein. The perforated plate 211 has a plurality of spaced-apart openings 213 or holes extending through the plate from one surface to the other. A series of spaced-apart grooves 214 or notches extend from one side of the plate 211 to the other and intersect the openings 213 so that fluid flowing into an opening 213 can flow down and out from the plate 211, e.g. into a receptacle of a vibratory separator or shale shaker beneath a basket in which is mounted a screen assembly with such a plate. There may be multiple holes 213 under each hole 213 as viewed in FIG. 6D across the plate's surface. The screening material 212 may be any disclosed herein and/or any known in the art.

It is within the scope of this invention for any known perforated plate or perforated member used as a support for a screen assembly which has a known series of spaced-apart perforations, holes, openings, etc. to have a second series of grooves or notches (e.g. but not limited to like the grooves 214) at any desired angle to the perforations, holes or openings, etc. through the plate (including, but not limited to at a right angle as shown in FIG. 6D) to conduct fluid down the plate as is done in the plate 211.

FIGS. 7A–7F show various baskets according to the present invention.

Figure 7A:
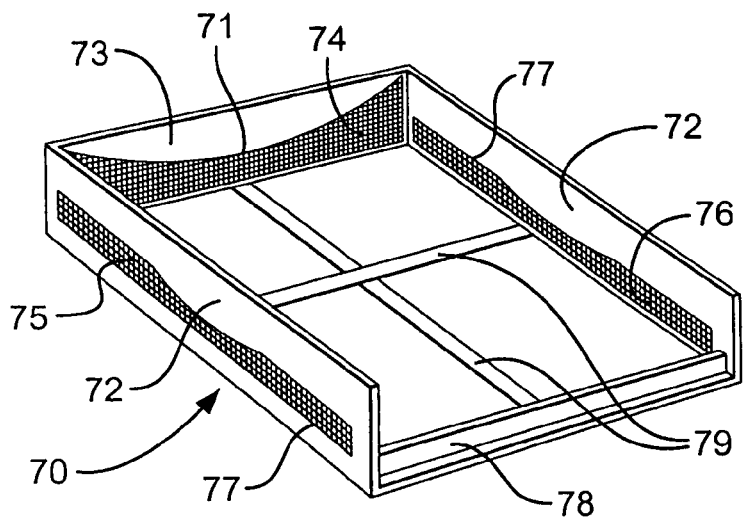
FIGS. 7A–7F are perspective views of baskets according to the present invention.

FIG. 7A shows a basket 70 with side walls 72, end wall 73, and cross-braces 79 on which screens for treating fluid introduced into the basket are to be mounted. End wall 73 has an end screen 74 over an end opening 71 for treating fluid introduced to the basket 70. Side screens 75, 76 are mounted over side openings 77 in the side walls 72. An end brace 78 is interconnected between side walls 72 at an exit end of the basket 70 (opposite the other end at which fluid is introduced into the basket).

Figure 7B:
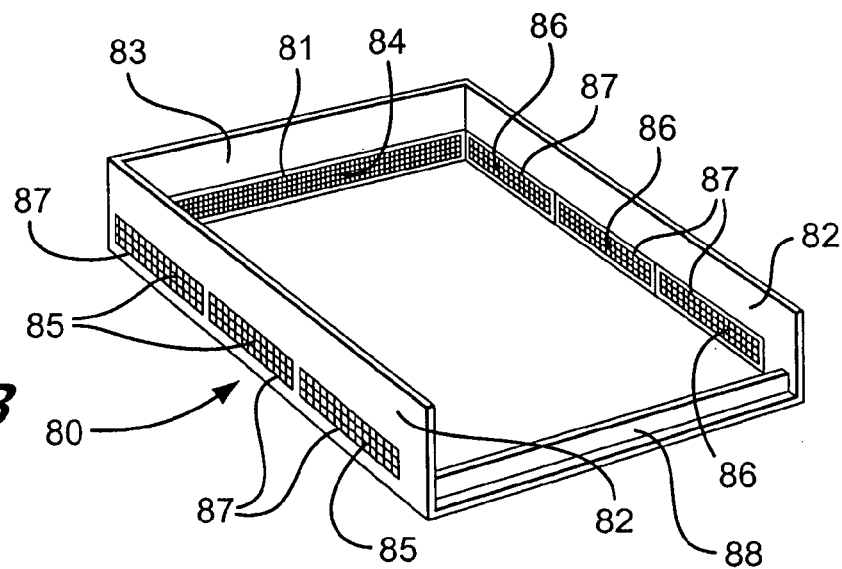

FIG. 7B shows a basket 80 with side walls 82, end wall 83, in which screens for treating fluid introduced into the basket are to be mounted. End wall 83 has an end screen 84 over an end opening 81 for treating fluid introduced to the basket 80. Side screens 85, 86 are mounted over side openings 87 in the side walls 82. An end brace 88 is interconnected between side walls 82 at an exit end of the basket 80 (opposite the other end at which fluid is introduced into the basket).

Figure 7C:
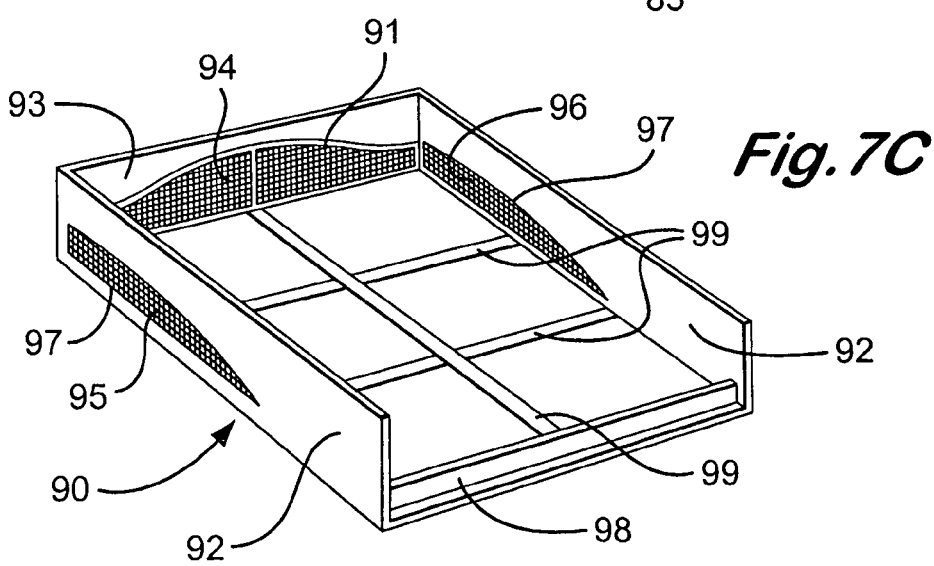

FIG. 7C shows a basket 90 with side walls 92, end wall 93, and cross-braces 99 on which screens for treating fluid introduced into the basket are to be mounted. End wall 93 has an end screen 94 over an end opening 91 for treating fluid introduced to the basket 90. Side screens 95, 96 are mounted over side openings 97 in the side walls 92. An end brace 98 is interconnected between side walls 92 at an exit end of the basket 90 (opposite the other end at which fluid is introduced into the basket).

Figure 7D:
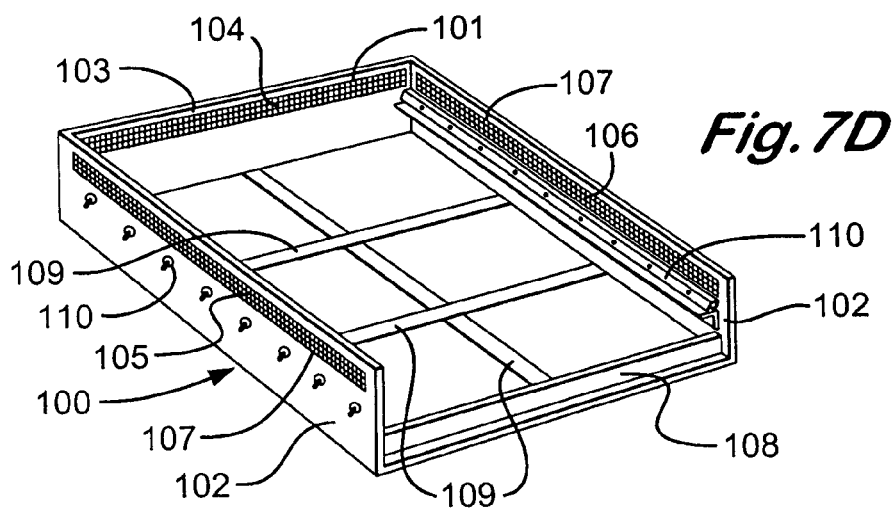

FIG. 7D shows a basket 100 with side walls 102, end wall 103, and cross-braces 109. End wall 103 has an end screen 104 over an end opening 101 for treating fluid introduced to the basket 100. Side screens 105, 106 are mounted over side openings 107 in the side walls 102. An end brace 108 is interconnected between side walls 102 at an exit end of the basket 100 (opposite the other end at which fluid is introduced into the basket). Mounting apparatus 110 (any known in the art) is used to mount screens in the basket 100.

Figure 7E:
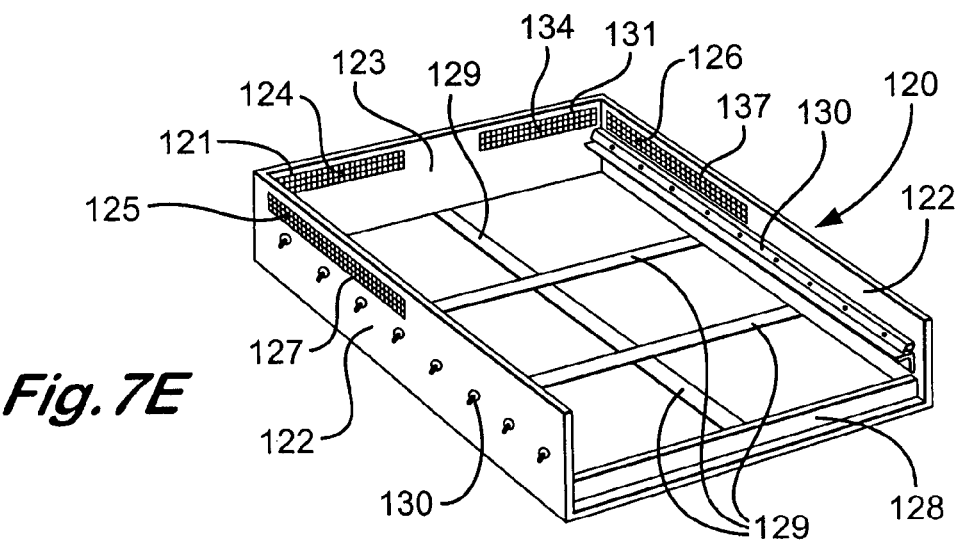

FIG. 7E shows a basket 120 with side walls 122, end wall 123, and cross-braces 129. End wall 123 has end screens 124, 134 over end openings 121, 131 for treating fluid introduced to the basket 120. Side screens 125, 126 are mounted over side openings 127, 137 in the side walls 122. An end brace 128 is interconnected between side walls 122 at an exit end of the basket 120 (opposite the other end at which fluid is introduced into the basket). Mounting apparatus 130 (any known in the art) is used to mount screens in the basket 120.

Figure 4:
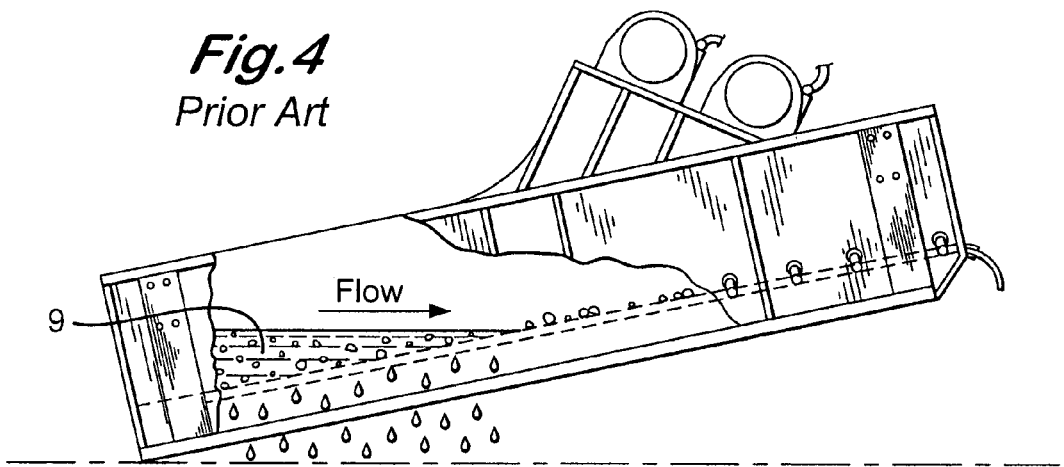
FIG. 4 is a side view of a basket for a shaker as shown in FIG. 1.
Figure 7F:
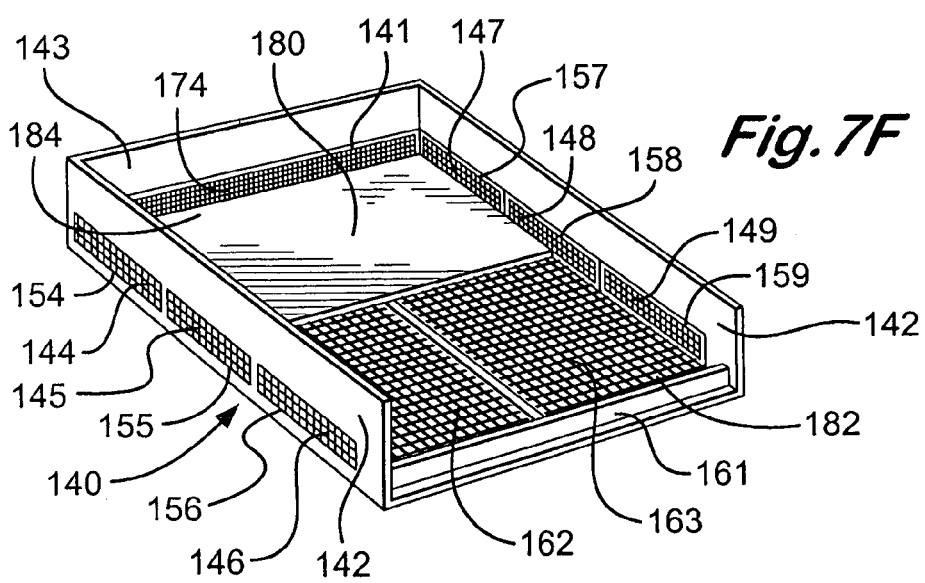

FIG. 7F shows a basket 140 with side walls 142, end wall 143, and screens 162, 163 mounted on the basket for treating fluid introduced into the basket. End wall 143 has an end screen 174 over an end opening 141 for treating fluid introduced to the basket 140. Side screens 144, 145, 146, 147, 148, 149 are mounted over side openings 154, 155, 156, 157, 158, 159 in the side walls 142. An end brace 161 is interconnected between side walls 142 at an exit end 182 of the basket 140 (opposite the other end at which fluid is introduced into the basket). A solid sheet or plate 180 is mounted in the basket at the fluid introduction end 184 opposite the solids exit end 182. The solid sheet or plate 180 performs no fluid treatment function of separating components of a fluid introduced into the basket 140. The end screen 174 and side screens and/or side screen portions adjacent the solid sheet or plate 180 do perform a fluid component separation function. It is within the scope of this invention for the solid sheet or plate to be sized so that it underlies a pond or pool (e.g. as shown in FIG. 4, item 9).

It is also within the scope of this invention for the solid sheet or plate to extend from the end wall 143 toward the exit end 182 six inches, one foot, eighteen inches, two feet, thirty inches, three feet, forty two inches, four feet, or any desired amount. Alternatively, the sheet or plate 180 may have a series of slits, slots, holes, openings and/or perforations therethrough so that the sheet or plate 180 does perform a fluid component separation function; and, in one such embodiment, the slits, slots, holes, openings and/or perforations (collectively referred to as "holes") are of a size like that of a finest screen mesh on top of a screen or screens used for the screens 162, 163. Any screen or screen assembly may be used in the basket 140. Any sheet or plate 180 may be used in any known basket or any basket according to the present invention.

Figure 8:
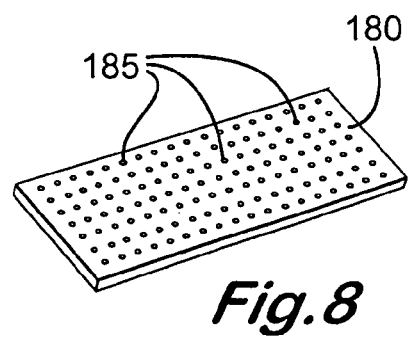
FIG. 8 is a perspective view of a plate or sheet for a basket according to the present invention.

FIG. 8 shows a plate 180 with a plurality of perforations 185 therethrough.

The present invention, therefore, provides in certain, but not necessarily all embodiments, a screen mounting basket for a vibratory separator for separating components of material introduced into the basket, the vibratory separator including a collection receptacle beneath the basket, the basket with two opposed spaced-apart side walls having first ends and second ends, the first ends spaced-apart by an end wall connected to each of the side walls, a basket bottom opening between the two spaced-apart side walls, basket bottom screening apparatus at the basket bottom opening, at least one basket aperture not through the basket bottom, at least one aperture screen over the at least one basket aperture, and the at least one aperture screen and the bottom screening apparatus for separating a component material from the material introduced into the basket, material flowing through the at least one aperture screen not flowing through the bottom screening apparatus, the separated component material flowing into the collection receptacle. Such a method may include one or some of the following, in any possible combination: wherein the basket aperture is through the end wall; wherein the basket aperture is through one of the two spaced-apart side walls; wherein the at least one aperture screen has a support with a plurality of openings therethrough suitable for the flow of fluid therethrough, the fluid from the material introduced into the basket, and the at least one aperture screen having one or a plurality of fluid conducting channels therein at an angle to the plurality of openings so that fluid flowing into one of the plurality of openings may then flow into the one or one of the plurality of fluid conducting channels and out from the support into the receptacle; wherein the support is a frame and the plurality of fluid conducting channels is a plurality of holes in part of the frame; wherein the support is a perforated plate, the plurality of openings is a plurality of openings through the perforated plate, and the plurality of fluid conducting channels is a plurality of holes through the perforated plate; and/or wherein the material introduced to the basket is drilling fluid with undesirable material therein and the separated component is drilling fluid.

The present invention, therefore, provides in certain, but not necessarily all embodiments, a screen mounting basket for a vibratory separator for separating components of material introduced into the basket, the vibratory separator including a collection receptacle beneath the basket, the basket with two opposed spaced-apart side walls having first ends and second ends, the first ends spaced-apart by an end wall connected to each of the side walls, a basket bottom opening between the two spaced-apart side walls, at least one end opening through the end wall, at least one end screen over the at least one end opening, at least one basket screen over the basket bottom opening, and the at least one end screen and the at least one basket screen for separating a component from the material, material flowing through the at least one aperture screen not flowing through the bottom screening apparatus, the separated component flowing into the collection receptacle. Such a method may include one or some of the following, in any possible combination: wherein the basket has at least one side opening in one of the two spaced-apart sides and at least one side basket screen is mounted over the at least one side opening for separating a component from the material; wherein the at least one basket screen is a two-dimensional screen; wherein the at least one basket screen is a three-dimensional screen; wherein the at least one end screen is within the basket; wherein the at least one end screen is releasably secured to the basket; wherein the at least one side basket screen is within the basket; wherein the at least one side basket screen is releasably secured to the basket; wherein the at least one end screen is a plurality of end screens adjacent each other end-to-end over the at least one end opening; wherein the at least one end screen is a plurality of end screens positioned vertically adjacent and parallel to each other over the at least one end opening; wherein the at least one side basket screen is a plurality of side basket screens adjacent each other end-to-end over the at least one side basket opening; wherein the at least side basket screen is a plurality of side basket screens positioned vertically adjacent and parallel to each other over the at least one side basket opening; wherein the at least one end screen opening is plurality of adjacent end openings and the at least one end screen is a plurality of end screens each over an opening of the plurality of end openings; wherein the at least one side basket opening is plurality of side basket openings and the at least one side basket screen is a plurality of side basket screens each over an opening of the plurality of side basket openings; wherein the material introduced to the basket is drilling fluid with undesirable material therein and the separated component is drilling fluid; wherein the at least one end screen has a support with a plurality of openings therethrough suitable for the flow of fluid therethrough, the fluid from the material introduced into the basket, and the at least one end screen having one or a plurality of fluid conducting channels therein at an angle to the plurality of openings so that fluid flowing into one of the plurality of openings may then flow into one of the one or plurality of fluid conducting channels and out from the support; wherein the support is a frame and the plurality of fluid conducting channels is a plurality of holes in part of the frame; and/or wherein the support is a perforated plate, the plurality of openings is a plurality of openings through the perforated plate, and the plurality of fluid conducting channels is a plurality of holes through the perforated plate.

The present invention, therefore, provides in certain, but not necessarily all embodiments, a screen apparatus for a vibratory separator, the vibratory separator having a basket, the vibratory separator for separating components of material introduced into the basket, the vibratory separator including a collection receptacle beneath the basket, the screen apparatus with screening material, a support, the screening material on the support, the support having a plurality of openings therethrough suitable for the flow of fluid therethrough, the fluid from the material introduced into the basket, the support having one or a plurality of fluid conducting channels therein at an angle to the plurality of openings so that fluid flowing into one of the plurality of openings may then flow into one of the plurality of fluid conducting channels and out from the support into the receptacle. Such a method may include one or some of the following, in any possible combination: screen apparatus wherein the material introduced into the basket is drilling fluid with undesirable material therein and the screen apparatus is for separating drilling fluid from the material; wherein the plurality of fluid conducting channels comprises a plurality of grooves in a surface of the support, each groove intersecting openings of the plurality of openings in the support; wherein the support is a frame and the plurality of fluid conducting channels is a plurality of holes in part of the frame; and/or wherein the support is a perforated plate, the plurality of openings is a plurality of openings through the perforated plate, and the plurality of fluid conducting channels is a plurality of holes through the perforated plate.

The present invention, therefore, provides in certain, but not necessarily all embodiments, a screen mounting basket for a vibratory separator for separating components of material introduced into the basket, the vibratory separator including a collection receptacle beneath the basket, the basket with two opposed spaced-apart side walls having first ends and second ends, the first ends spaced-apart by an end wall connected to each of the side walls, a basket bottom opening between the two spaced-apart side walls, at least one side basket opening through one of the two spaced-apart side walls, at least one side basket screen over the at least one side basket opening, at least one basket screen over the basket bottom opening, and at least one side basket screen over the at least one side basket opening, at least one basket screen over the basket bottom opening, and the at least one side basket screen and the at least one basket screen for separating a component from the material, component material separated by the at least one side basket screen not flowing through the at least one basket screen, the separated component material flowing into the collection receptacle.

The present invention, therefore, provides in certain, but not necessarily all embodiments, a vibratory separator system for separating components from a liquid-solid mixture fed to the vibratory separator system, the vibratory separator system with a frame, a screen mounting basket on the frame, vibrating apparatus connected to the screen mounting basket for vibrating the screen mounting basket, the screen mounting basket with two opposed spaced-apart side walls having first ends and second ends, the first ends spaced-apart by an end wall connected to each of the side walls, a basket bottom opening between the two spaced-apart side walls, basket bottom screening apparatus at the basket bottom opening, at least one basket aperture not through the basket bottom, at least one aperture screen over the at least one basket aperture, and the at least one aperture screen and the bottom screening apparatus for separating a component material from the material introduced into the basket, material flowing through the at least one aperture screen not flowing through the bottom screening apparatus, the separated component material flowing into the collection receptacle; and such a vibratory separator system wherein the liquid-solid mixture is drilling fluid with undesirable material therein and the component separated by the at least one aperture screen is drilling fluid.

The present invention, therefore, provides in certain, but not necessarily all embodiments, a method for separating components of a material with a vibratory separator, the vibratory separator having a screen mounting basket into which the material is introduced, the vibratory separator including a collection receptacle beneath the basket, the basket with two opposed spaced-apart side walls having first ends and second ends, the first ends spaced-apart by an end wall connected to each of the side walls, a basket bottom opening between the two spaced-apart side walls, basket bottom screening apparatus at the basket bottom opening, at least one basket aperture not through the basket bottom opening, at least one aperture screen over the at least one basket aperture, and the at least one aperture screen and the bottom screening apparatus for separating a component material from the material introduced into the basket, the separated component material flowing into the collection receptacle, the method including introducing the material into the basket, separating a component of the material with the basket bottom screening apparatus and with the at least one aperture screen, component material separated by the at least one aperture screen not flowing through the basket bottom screening apparatus and the thus separated component material flowing into the receptacle.

The present invention, therefore, provides in certain, but not necessarily all embodiments, a method for separating components of a material with a vibratory separator, the vibratory separator having a screen mounting basket into which the material is introduced, the vibratory separator including a collection receptacle beneath the basket, the basket with two opposed spaced-apart side walls having first ends and second ends, the first ends spaced-apart by an end wall connected to each of the side walls, a basket bottom opening between the two spaced-apart side walls, at least one end opening through the end wall, at least one end screen over the at least one end opening, at least one basket screen over the basket bottom opening, and the at least one end screen and the at least one basket screen for separating a component from the material, the separated component flowing into the collection receptacle, the method including introducing the material into the basket, separating a component of the material with the at least one basket screen and with the at least one end screen, component material flowing through the at least one end screen not flowing through the at least one basket screen and the thus separated component material flowing into the receptacle.

The present invention, therefore, provides in certain, but not necessarily all embodiments, a method for reducing the weight of material on the bottom screening apparatus of a vibratory separator, the vibratory separator having a screen mounting basket into which the material is introduced, the vibratory separator including a collection receptacle beneath the basket, the basket with a plurality of interconnected walls, a basket bottom opening between the walls, basket bottom screening apparatus at the basket bottom opening, at least one basket aperture through one of the walls and not through the basket bottom, at least one aperture screen over the at least one basket aperture, and the at least one aperture screen and the bottom screening apparatus for separating a component material from the material introduced into the basket, the separated component material flowing into the collection receptacle, the method including introducing the material into the basket, flowing part of the material through the at least one aperture screen, said part flowing into the receptacle without passing through the bottom screening apparatus.

The present invention, therefore, provides in certain, but not necessarily all embodiments, a screen mounting basket for a vibratory separator or shale shaker for separating components of material (e.g. drilling cuttings material) introduced into the basket, the vibratory separator or shaker including a collection receptacle beneath the basket, the basket including: two opposed spaced-apart side walls having first ends and second ends, the first ends spaced-apart by spaced-apart end walls connected to each of the side walls; a basket bottom between the two spaced-apart side walls; at least one screen assembly or a plurality of such assemblies positioned vertically in the basket for intercepting material introduced into the basket and for screening said material; and the screen assembly or screen assemblies extending from one side wall of the basket to the other.

The present invention, therefore, provides in certain, but not necessarily all embodiments, a screen mounting basket for a vibratory separator or shale shaker for separating components of material (e.g. drilling cuttings material) introduced into the basket, the vibratory separator or shaker including a collection receptacle beneath the basket, the basket including: two opposed spaced-apart side walls having first ends and second ends, the first ends spaced-apart by spaced-apart end walls connected to each of the side walls; a basket bottom between the two spaced-apart side walls; at least one screen assembly or screen assemblies positioned vertically in the basket for intercepting material introduced into the basket and for screening said material; the screen assembly or assemblies extending from one side wall of the basket to the other; or a plurality of basket bottom openings; the at least one screen assembly or each assembly positioned over a basket bottom opening; and each screen assembly having at least one fluid conducting hole so that a portion of the material introduced into the basket is flowable into the or each screen assembly and through the at least one fluid conducting hole into the basket bottom opening and thence into the collection receptacle.

The present invention, therefore, provides in certain, but not necessarily all embodiments, a vibratory separator system for separating components from a liquid-solid mixture fed to the vibratory separator system, the vibratory separator system including a base, a screen mounting basket on the base, vibrating apparatus connected to the screen mounting basket for vibrating the screen mounting basket, and a screen mounting basket according to the present invention.

Figure 9A:
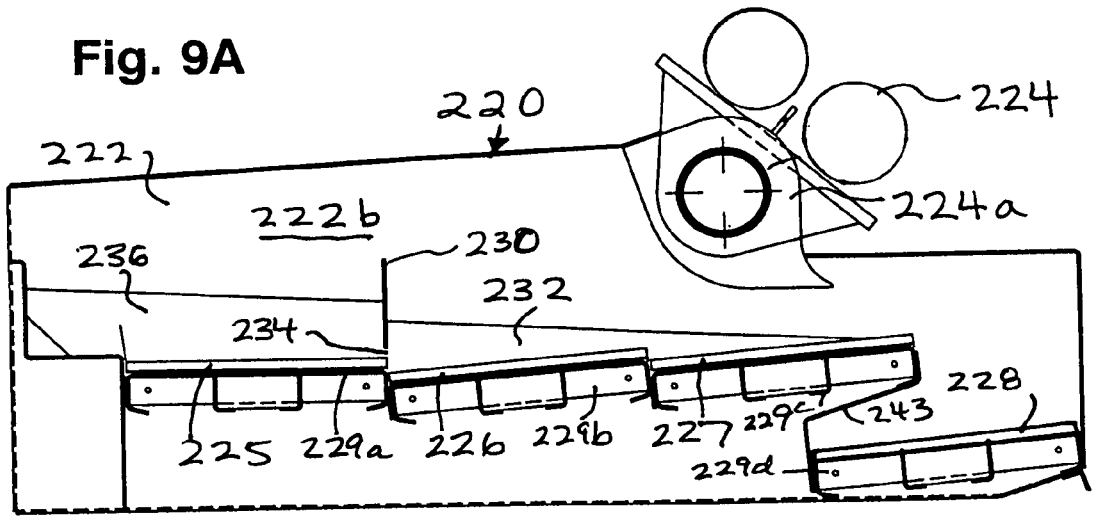
FIG. 9A is a side section view of a shale shaker according to the present invention.

FIG. 9A shows a shale shaker 220 with a basket 222 vibrated by vibratory apparatus 224 mounted on mount 224a. Screens 225, 226, 227, and 228 are secured to mount apparatuses 229a, b, c and d within the basket 222. A dam 230 extends across the basket 222 between sidewalls 222a and 222b thereof and is positioned so that material 232 to be treated by the shale shaker 220 can flow beneath the dam 230 through an opening 234 formed between the lower edge of the dam 230 and the upper surface of the screen 225. The dam 230 creates a larger pool 236 of material than would be present if the dam was not used. It is to be understood that although a shale shaker is shown the dam 230 (and any dam or dams according to the present invention) may be used with any vibratory separator which treats material that can form a pool. The material may be drilling fluid with solid contaminates. As with any shaker or separator herein according to the present invention, any desired number of screens may be used. Any known prior art screen or screen assembly may be used.

Figure 10:
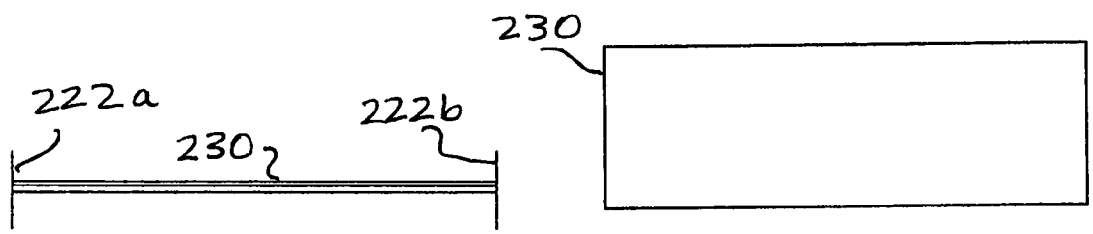
FIG. 10 is a side section view of a shale shaker according to the present invention.
Figure 10:
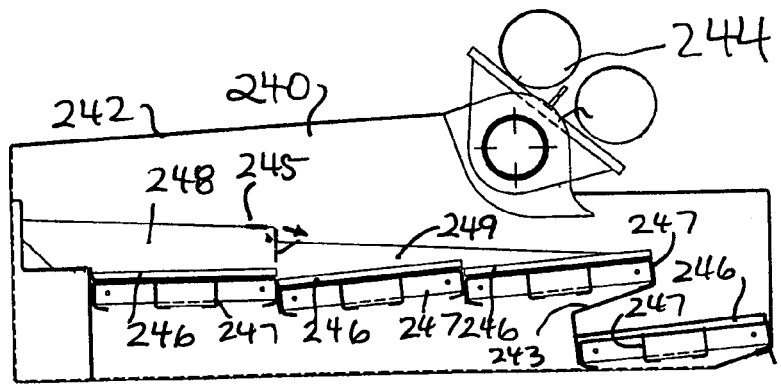

FIG. 10 shows a shale shaker 240 similar to the shale shaker 220, but with a dam 245 designed and sized so that a portion of material 249 to be treated flows over the dam 245. The dam 245 assists in forming a pool 248 of the material 249 over a screen 246. Screens 246 are mounted to mounts 247.

Any of the shakers of FIGS. 9A, 10, 11, 12, 15, and 16, and any shaker according to the present invention may, optionally, have a backflow plate 243 to conduct material that has flowed through a screen away from a lower screen.

Figure 11:
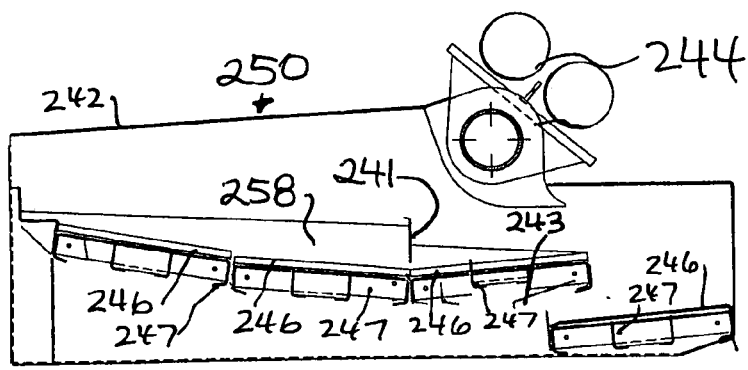
FIG. 11 is a side section view of a shale shaker according to the present invention.

A shale shaker 250 shown in FIG. 11 is like the shaker 240 of FIG. 10 and like numerals indicate like parts. A dam 241, like the dam 230, FIG. 9A, is located at the end of a second screen (as viewed from the left side of the shaker 250 as shown in FIG. 11). Thus a pool 258 of material is formed above two screens instead of above one screen as in FIG. 9A. It is within the scope of the present invention for any shaker or separator according to the present invention to have a dam positioned as in FIG. 11 (and/or as in any of FIGS. 9A, 12, and 15).

It is within the scope of the present invention for any dam herein according to the present invention and/or any dam connector herein according to the present invention to be made from plastic, composite, fiberglass, metal, zinc, steel, stainless steel, aluminum, brass, bronze, zinc alloy, aluminum alloy or wood.

Any shaker or separator according to the present invention may have multiple dams located at any point or points. As shown in FIG. 12, in a shaker 260 multiple dams 265a, 265b, and 265c are located above a first screen 246 (optionally, any one of these dams may be deleted; with dam 265a deleted, two pools are formed above the screen assembly 246 beneath the dams). The shaker 260 is like the shaker 240 and like numerals indicate like parts. It is to be understood for the shakers and separators of FIGS. 9A–16 that treated material flows through the screen(s) down to a collection tank or receptacle.

FIGS. 13A–13G present top views of dams according to the present invention (like the dams of FIGS. 10, 11, 12, 15 and 16 or for any dam according to the present invention). The dams of FIGS. 13D–13G may be reversed in position as viewed in these figures. Any dam herein may have a size such that flow is possible beneath the dam between the dam and an upper surface of a screen positioned below the dam. Alternatively any dam herein may be sized and located so that no such flow is possible and flow occurs only over such a dam.

FIGS. 13A–13G each include basket side walls 262a, 262b of a basket (not shown). FIG. 13A shows a dam 271 sized and located so that flow of material to be treated is possible around its two ends.

FIG. 13B shows a dam 272 with parts 272a, 272b, with spaces at the ends thereof adjacent the basket walls and a central space for flow.

FIG. 13C shows a dam 273 with parts 273a, 273b, 273c and 273d with spaces therebetween for flow.

FIG. 13D shows a dam 274 with parts 274a and 274b with a central space therebetween for flow.

FIG. 13E shows a dam 275 with two parts 275a, 275b which form a generally pointed V-shaped dam when viewed from above.

FIG. 13F shows a dam 276 with parts 276a, 276b, and 276c with flow spaces between the parts.

FIG. 13G shows a dam 277 which is generally curved as viewed from above.

FIGS. 14A–14I illustrate various possible configurations for dams according to the present invention showing various possible front views. Any of the dams of FIGS. 14A–14I may be inverted in use. The bottom structure of the dams of FIGS. 14F and 14I may be provided at the top thereof, at the top of any dam according to the present invention, and/or at the bottom of any dam according to the present invention. Any dam according to the present invention may have one or more holes therethrough of any desired shape or number and, in one aspect, one, two, three or more layers of mesh or screening material may cover such hole(s).

Figure 14A:
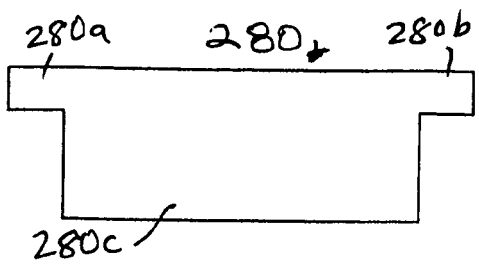
FIG. 14A is a front view of a dam according to the present invention.

FIG. 14A shows a dam 280 according to the present invention with two end shoulders 280a, 280b. The end shoulders 280a, 280b of a body 280c may be located within a basket so that flow is possible under them; they may be located above basket walls with the dam in contact with the interior of the basket walls; or they may be located above the basket walls with the dam sized so that flow is possible beneath the shoulders between the dam and the interior of the basket walls.

Figure 14B:
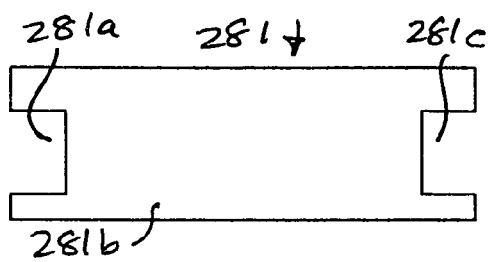
FIG. 14B is a front view of a dam according to the present invention.

FIG. 14B shows a dam 281 with a body 281b with open areas 281a and 281c for flow of material through the dam 281. These open areas are shown as generally rectangular but they may be any suitable shape.

Figure 14C:
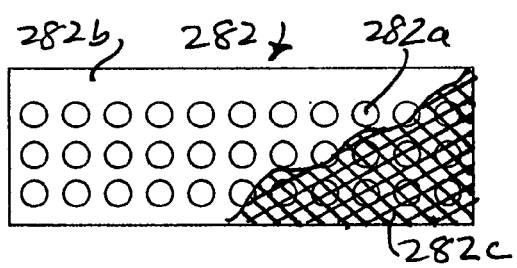
FIG. 14C is a front view of a dam according to the present invention.

FIG. 14C illustrates that any dam according to the present invention may have one or a plurality of spaced-apart holes or openings for flow therethrough. A dam 282 has holes 282a in a body 282b. Optionally any dam according to the present invention with one or more holes may have screening material (e.g. any known screening material with any known layer or layers) over the holes on one or on both sides of the dam. For example, as shown in FIG. 14C, screening material 282c covers the holes 282a (screening material shown partially, but understood to cover all holes 282a). Similarly any flow space or opening between any dam's parts may have such screening material. Holes or perforations may be provided across substantially all of a dam's surface area or on only a portion thereof.

Figure 14D:
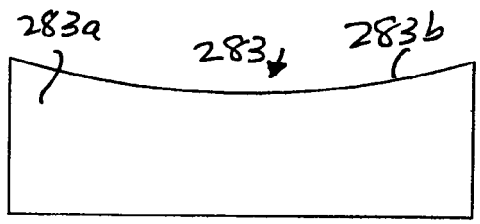
FIG. 14D is a front view of a dam according to the present invention.

FIG. 14D shows a dam 283 with a body 283a with a generally curved trop 283b.

Figure 14E:
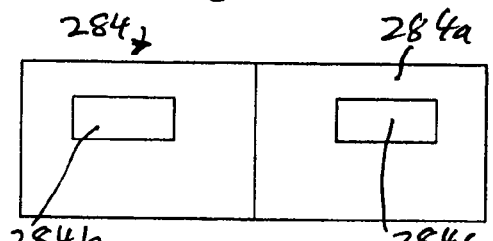
FIG. 14E is a front view of a dam according to the present invention.

FIG. 14E shows a dam 284 with a body 284a having openings 284b and 284c therethrough.

Figure 14F:
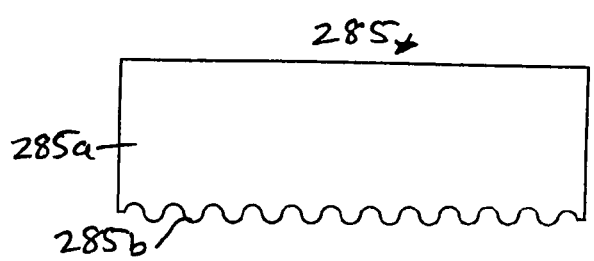
FIG. 14F is a front view of a dam according to the present invention.

FIG. 14F shows a dam 285 with a body 285a that has a lower corrugated edge 285b.

Figure 14G:
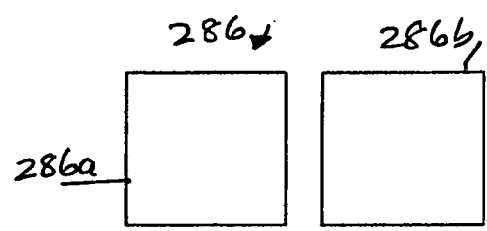
FIG. 14G is a front view of a dam according to the present invention.

FIG. 14G shows a dam 286 with two spaced-apart parts 286a and 286b with a space therebetween for flow.

Figure 14H:
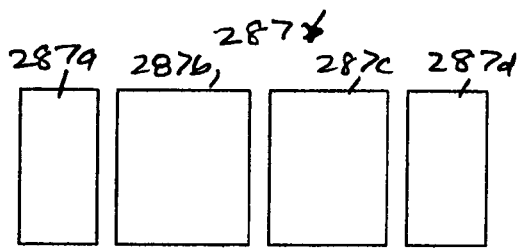
FIG. 14H is a front view of a dam according to the present invention.

FIG. 14H shows a dam 287 with parts 287a–287d with spaces therebetween for flow.

Figure 14I:
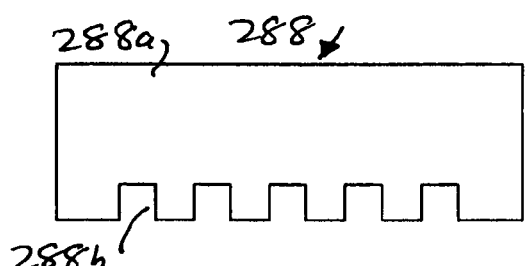
FIG. 14I is a front view of a dam according to the present invention.

FIG. 14I shows a dam 288 with a body 288a having a lower slotted edge 288b. The lower edge of a dam according to the present invention, e.g., but not limited to, as shown in FIGS. 14F and 14I, may be shaped to correspond to the shape of a screen above which the dam is located to contact the screen or to provide flow channels between the screen and the dam.

Figure 15:
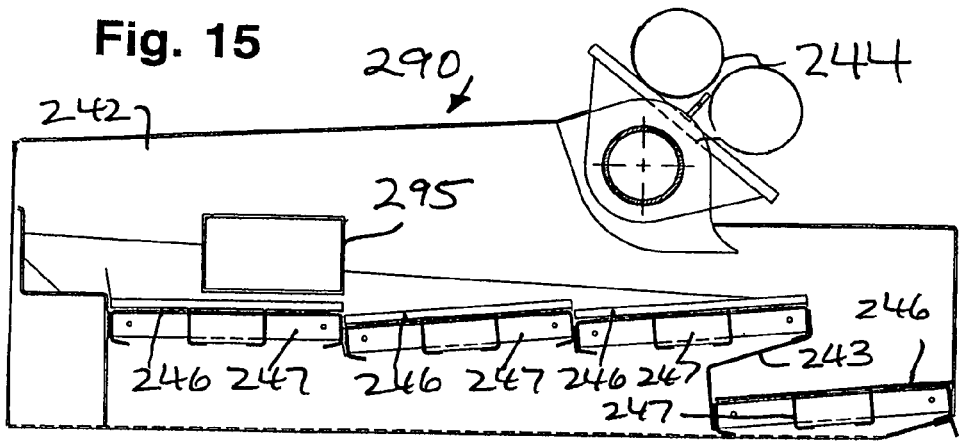
FIG. 15 is a side section view of a shale shaker according to the present invention.

A shaker 290 shown in FIG. 15 is like the shaker 240, above, and like numerals indicate like parts A dam 295 which extends between walls of the shaker is a solid or hollow 3-dimensional dam. As with any dam according to the present invention, it may have holes or openings through it as described herein and it may be sized and located with a flow path beneath it. It may be multi-part (e.g. as the previously-described multi-part dams, but in 3-D) and it may be any desired general shape in addition to the generally rectangular shape, shown in FIG. 15 (e.g., but not limited to viewed from side and/or top and/or front, square, oval, or elliptical).

Figure 16:
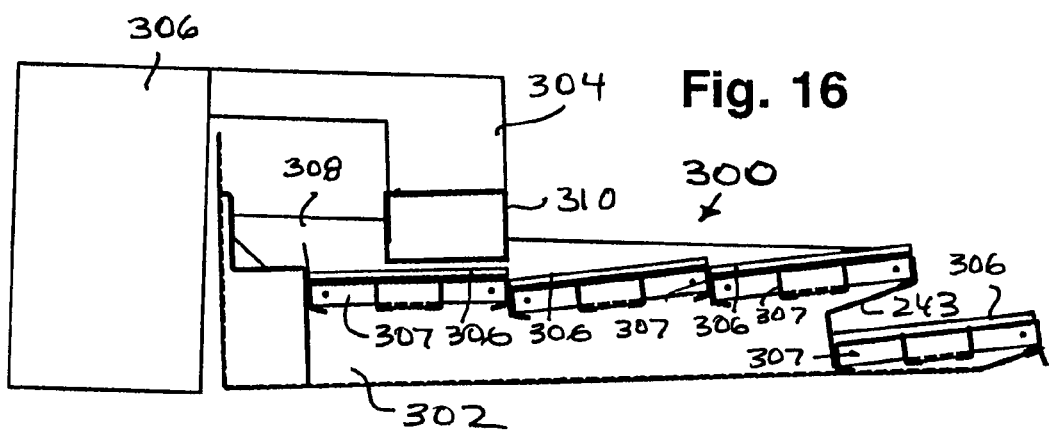
FIG. 16 is a side section view of a shale shaker according to the present invention.

FIG. 16 shows a shale shaker 300 according to the present invention with a basket 308 vibrated by vibratory apparatus (not shown; as with any shaker herein any suitable vibratory apparatus may be used). The shaker 300 has screens 306 on mount apparatus 307 and a dam 310 that extends between the walls (touching the walls or not, connected to the basket, or mounted to structure other than the basket and/or to structure that does not vibrate with the basket) of the basket 308 (the dam 310 like any dam herein according to the present invention, flat or 3-D). A connector 304 connects the dam 310 to a tank 309 or, optionally, to any other part of the structure or adjacent structure so that the dam does not vibrate with the basket 308. A dam that does not vibrate with the basket has mass that is not vibrated, thereby reducing power requirements. A dam that is not vibrated can, in some instances, be required to meet less stringent strength and durability requirements. A dam not connected to the basket which does not vibrate with the basket does not affect a basket's integrity or performance. To the extent that part of a dam is in a pool of fluid, the depth of the pool is increased and, to that extent the head of fluid on a screen or screens is increased thereby increasing the throughput of material through the screen. Any dam according to the present invention can be connected to a basket and vibrate therewith or connected to structure other than the basket so it does not vibrate with the basket.

Figure 17:
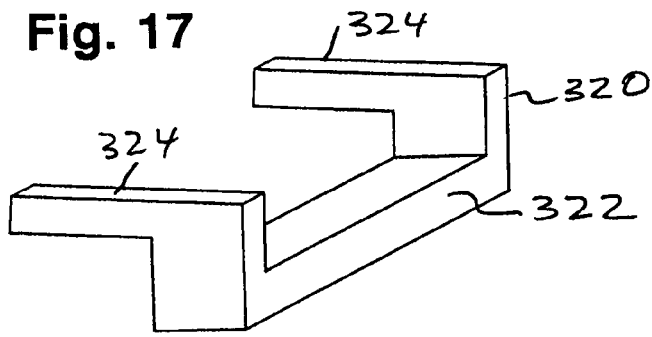
FIG. 17 is a perspective view of a dam according to the present invention.

FIG. 17 shows a dam 320 with a main dam body 322 and connectors 324 for connecting the dam 320 to other shaker structure (structure other than a basket). The connectors 324 may be any suitable size and may be separate pieces connected to the main body 322 or, as shown, the dam and connectors may be a single integral piece. Any dam according to the present invention may have such connectors.

Figure 18:
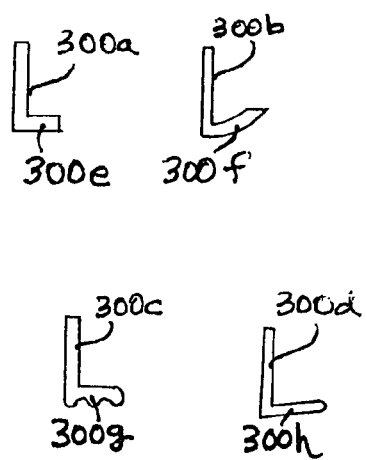
FIG. 18 presents end views of dams according to the present invention.

Any dam according to the present invention may have a generally rectangular cross-section when viewed on end, e.g. as the dams in FIGS. 9A, 9C, 11 and 12. Alternatively any dam according to the present invention may have a shape, when viewed on end and in position, e.g., as a dam in FIG. 9A, which includes a lower non-vertical member such as the dams 300a, 300b, 300c and 300d shown in FIG. 18 which have, respectively, lower non-vertical members 300e (substantially horizontal), 300f (curved upwardly), 300g (wavy), and 300h (inclined upwardly). In use any dam may be positioned so that its cross-section viewed on end is a mirror image of the dams as shown in FIG. 18. Any dam according to the present invention may have one of the non-vertical members shown in FIG. 18. Any screen assembly in FIGS. 5F–5H may be replaced by any dam according to the present invention and by any dam in FIGS. 9A–18.

In those embodiments in which a dam does not vibrate with a basket, and there is a flow space between the bottom of the dam and the top of the basket's floor, the basket floor moves up and down with respect to the bottom of the dam as the basket vibrates. Due to this action, material underneath the dam is subjected to forces which facilitate screening action of screening material located beneath the dam, thereby increasing the throughput of material through that portion of the screening material.

The present invention, therefore, in at least some, but not necessarily all embodiments, provides a screen mounting basket for a vibratory separator (e.g., but not limited to, a shale shaker) for separating components of material introduced into the basket, the basket including two opposed spaced-apart side walls having first ends and second ends, the first ends spaced-apart by an end wall connected to each of the side walls; a basket bottom between the two spaced-apart side walls; at least one dam positioned within the basket for intercepting material introduced into the basket, the at least one dam having a first side and a second side; and the at least one dam extending within the basket such that a first pool of material on the first side is deeper than a second pool of material on the second side. Such a screen mounting basket may have one or some (in any possible combination) of the following: wherein the at least one dam is a plurality of spaced-apart dams; wherein the basket is vibratable by vibratory apparatus, and the at least one dam is connected to the basket and vibratable therewith; wherein the basket is vibratable by vibratory apparatus, and the at least one dam is not connected to the basket and is not vibratable therewith; wherein the at least one dam is configured and positioned so that there is a flow space beneath the dam into which a portion of the material is flowable above screening material of one or more screen assemblies located beneath the at least one dam; wherein the at least one dam has at least one hole therethrough through which material is flowable; wherein screening material covers the at least one hole; wherein the at least one hole is a plurality of holes and screening material covers each hole of the plurality of holes; a screen assembly mounted in the basket for screening the material, and the at least one dam positioned for forming a pool of the material over the screen assembly; two screen assemblies mounted in the basket for screening the material, including a first screen assembly and a second screen assembly, and the at least one dam comprising one dam positioned for forming a pool of the material over the two screen assemblies; a screen assembly mounted in the basket for screening the material, and the at least one dam comprising at least two dams positioned above the screen assembly; wherein the at least two dams are positioned so that two pools are formed above the screen assembly; wherein the at least one dam is configured and positioned so that a portion of the material is flowable over the at least one dam; the at least one dam comprises a multi-part dam with a plurality of at least two pieces, the at least two pieces positioned so that there is at least one flow path for material between the at least two pieces; wherein the at least one dam has two ends and is configured and positioned so that flow paths are provided around the two ends within the basket; wherein the at least one dam has a first part and a second part, the first part extending substantially vertical with respect to the basket, the second part projecting from the first part and extending non-vertically with respect to the basket; at least one end opening through the end wall, at least one end screen over the at least one end opening; wherein the basket has at least one side opening in one of the two spaced-apart side walls and at least one side basket screen is mounted over the at least one side opening; and/or wherein the material introduced to the basket is drilling fluid with undesirable material therein.

The present invention, therefore, in at least some, but not necessarily all embodiments, provides a vibratory separator system for separating components from a liquid-solid mixture fed to the vibratory separator system, the vibratory separator system including: a base; a screen mounting basket on the base; vibrating apparatus connected to the screen mounting basket for vibrating the screen mounting basket; the screen mounting basket as any herein according to the present invention.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A screen mounting basket for a vibratory separator for separating components of material introduced into the basket, the basket comprising two opposed spaced-apart side walls having first ends and second ends, the first ends spaced-apart by an end wall connected to each of the side walls, a basket bottom between the two spaced-apart side walls,
at least one dam positioned within the basket for intercepting material introduced into the basket, the at least one dam having a first side and a second side,
the at least one dam extending within the basket such that a first pool of material on the first side is deeper than a second pool of material on the second side,
the basket is vibratable by vibratory apparatus, and
the at least one dam is not connected to the basket and is not vibratable therewith.

2. A screen mounting basket for a vibratory separator for separating components of material introduced into the basket, the basket comprising
two opposed spaced-apart side walls having first ends and second ends, the first ends spaced-apart by an end wall connected to each of the side walls,
a basket bottom between the two spaced-apart side walls,
at least one dam positioned within the basket for intercepting material introduced into the basket, the at least one dam having a first side and a second side,
the at least one dam extending within the basket such that a first pool of material on the first side is deeper than a second pool of material on the second side,
the at least one dam has at least one hole therethrough through which material is flowable, and
screening material covers the at least one hole.

3. The screen mounting basket of claim 2 wherein the at least one hole is a plurality of holes and screening material covers each hole of the plurality of holes.

4. A vibratory separator system for separating components from a liquid-solid mixture fed to the vibratory separator system, the vibratory separator system comprising
a base,
a screen mounting basket on the base,
two opposed spaced-apart side walls having first ends and second ends, the first ends spaced-apart by an end wall connected to each of the side walls,
a basket bottom between the two spaced-apart side walls,
at least one dam positioned within the basket for intercepting material introduced into the basket, the at least one dam having a first side and a second side,
the at least one dam extending within the basket such that a first pool of material on the first side is deeper than a second pool of material on the second side,
the basket is vibratable by vibratory apparatus, and
the at least one dam is not connected to the basket and is not vibratable therewith.

5. A vibratory separator system for separating components from a liquid-solid mixture fed to the vibratory separator system, the vibratory separator system comprising
a base,
a screen mounting basket on the base,
two opposed spaced-apart side walls having first ends and second ends, the first ends spaced-apart by an end wall connected to each of the side walls,
a basket bottom between the two spaced-apart side walls,
at least one dam positioned within the basket for intercepting material introduced into the basket, the at least one dam having a first side and a second side,
the at least one dam extending within the basket such that a first pool of material on the first side is deeper than a second pool of material on the second side,
the at least one dam has at least one hole therethrough through which material is flowable, and
screening material covers the at least one hole.

6. A screen mounting basket for a vibratory separator for separating components of material introduced into the basket, the basket comprising
two opposed spaced-apart side walls having first ends and second ends, the first ends spaced-apart by an end wall connected to each of the side walls,
screen apparatus in the basket for screening the material,
a basket bottom between the two spaced-apart side walls,
at least one dam positioned within the basket for intercepting material introduced into the basket, the at least one dam having a first side and a second side,
the at least one dam positioned above the screen apparatus,
the at least one dam extending within the basket such that a first pool of material on the first side is deeper than a second pool of material on the second side,
the at least one dam configured and positioned so that there is a flow space beneath the dam into which a portion of the material is flowable,
the screen apparatus comprising two screen assemblies mounted in the basket for screening the material, including a first screen assembly and a second screen assembly, and
the at least one dam comprising a dam positioned for forming a pool of the material over the two screen assemblies.

7. The screen mounting basket of claim 6 wherein the at least one dam is a plurality of spaced-apart dams.

8. The screen mounting basket of claim 6 wherein
the basket is vibratable by vibratory apparatus, and
the at least one dam is connected to the basket and vibratable therewith.

9. The screen mounting basket of claim 6 wherein
the basket is vibratable by vibratory apparatus, and
the at least one dam is not connected to the basket and is not vibratable therewith.

10. The screen mounting basket of claim 6 wherein
the at least one dam has at least one hole therethrough through which material is flowable.

11. The screen mounting basket of claim 10 wherein screening material covers the at least one hole.

12. The screen mounting basket of claim 10 wherein the at least one hole is a plurality of holes and screening material covers each hole of the plurality of holes.

13. The screen mounting basket of claim 6 further comprising
the at least one dam positioned for forming a pool of the material over the screen apparatus.

14. The screen mounting basket of claim 6 further comprising
a screen assembly mounted in the basket for screening the material, and
the at least one dam comprising at least two dams positioned above the screen assembly.

15. The screen mounting basket of claim 14 wherein the at least two dams are positioned so that two pools are formed above the screen apparatus.

16. The screen mounting basket of claim 6 wherein the at least one dam is configured and positioned so that a portion of the material is flowable over the at least one dam.

17. The screen mounting basket of claim 6 wherein
the at least one dam comprises a multi-part dam with a plurality of at least two pieces,
the at least two pieces positioned so that there is at least one flow path for material between the at least two pieces.

18. The screen mounting basket of claim 6 wherein the at least one dam has two ends and is configured and positioned so that flow paths are provided around the two ends within the basket.

19. The screen mounting basket of claim 6 wherein the at least one dam has a first part and a second part, the first part extending substantially vertical with respect to the basket, the second part projecting from the first part and extending non-vertically with respect to the basket.

20. The screen mounting basket of claim 6 further comprising
at least one end opening through the end wall,
at least one end screen over the at least one end opening.

21. The screen mounting basket of claim 6 wherein the basket has at least one side opening in one of the two spaced-apart side walls and at least one side basket screen is mounted over the at least one side opening.

22. The screen mounting basket of claim 6 wherein the material introduced to the basket is drilling fluid with undesirable material therein.

* * * * *